Jan. 15, 1963 R. POLK, JR., ET AL 3,073,365
CITRUS FRUIT PEELING MACHINE
Original Filed Nov. 1, 1954 25 Sheets-Sheet 3
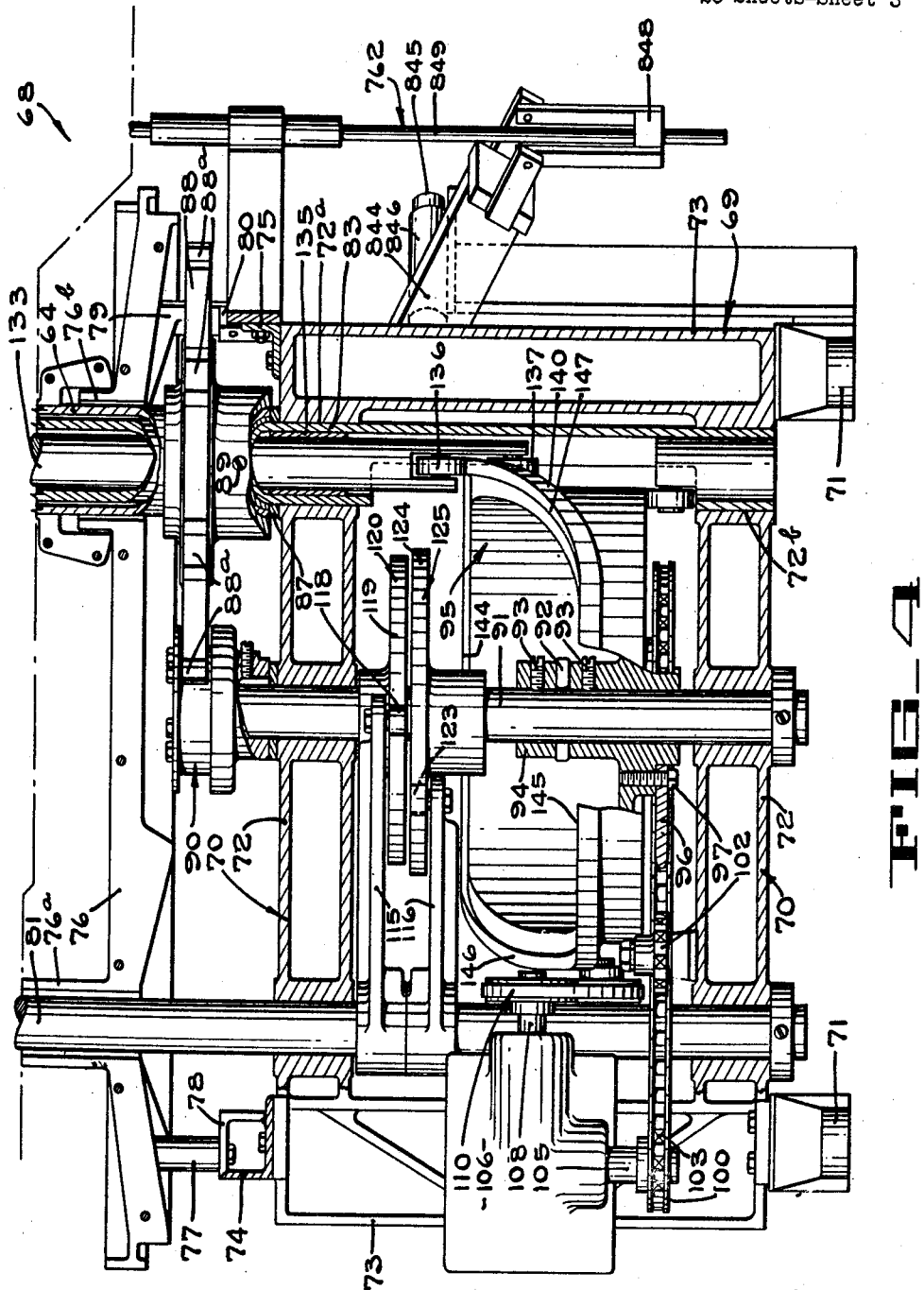
FIG_4
INVENTORS
RALPH POLK, JR.
WILBER C. BELK
THOMAS G. COX
BY *Hans G. Hoffmeister*
ATTORNEY

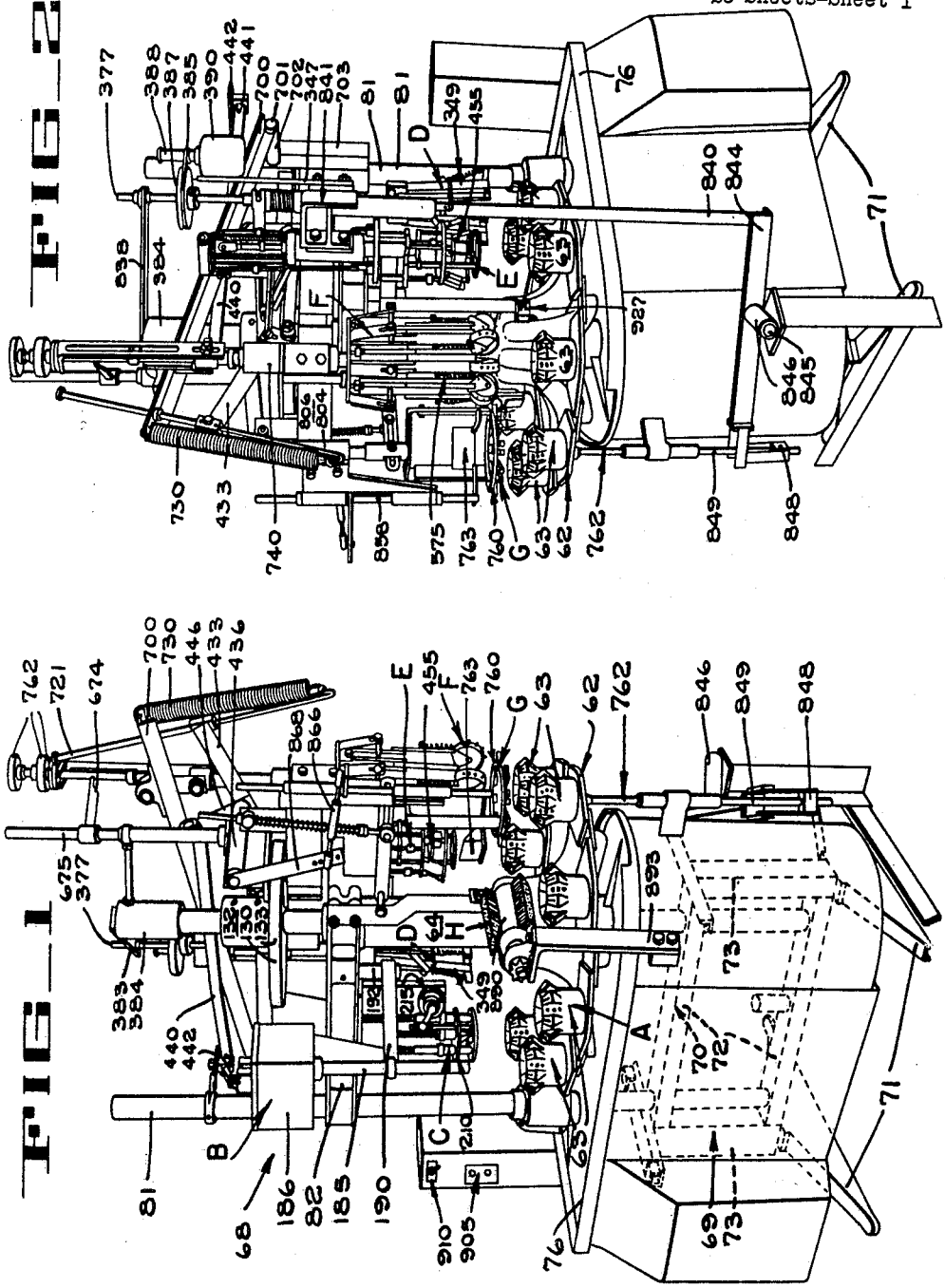

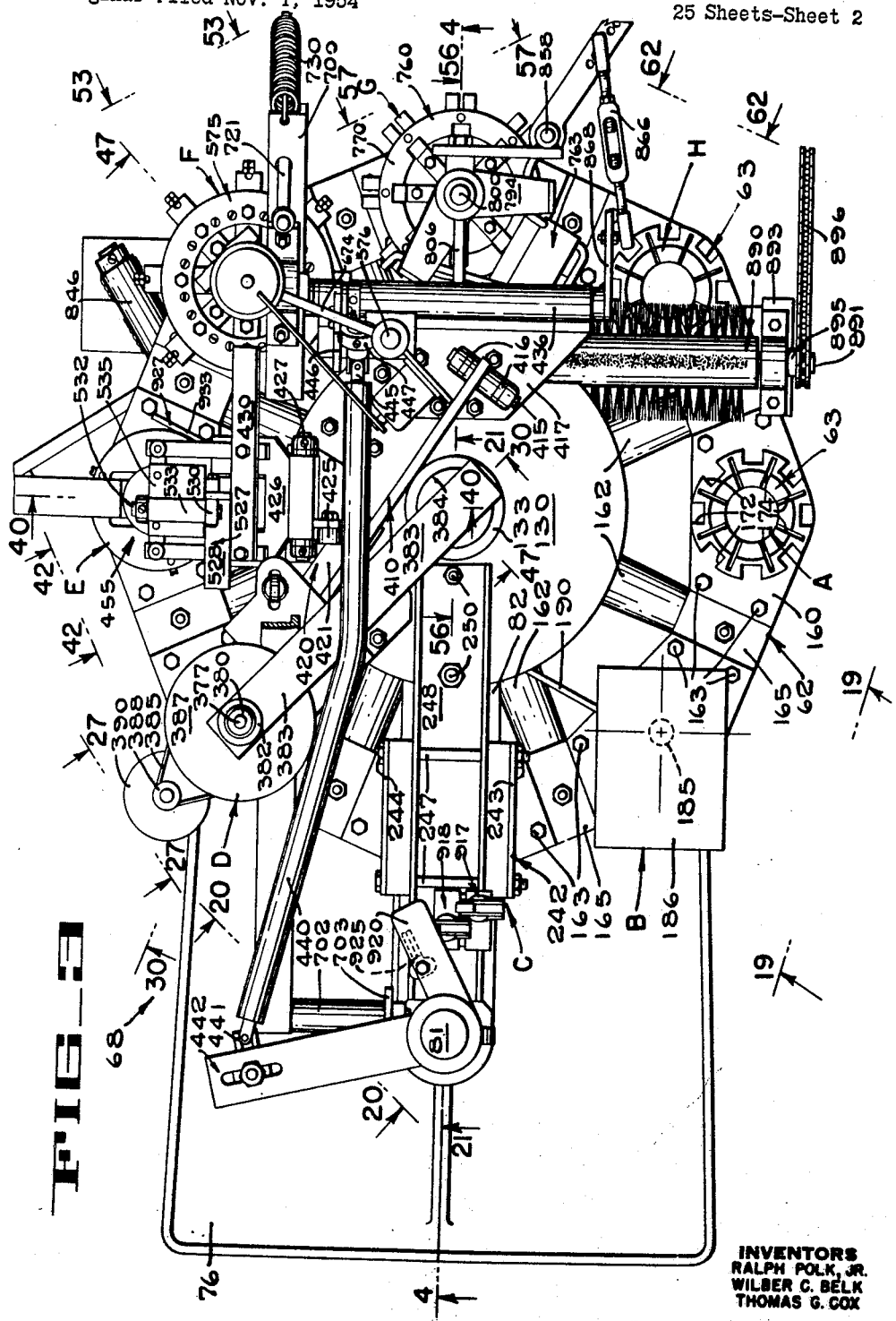

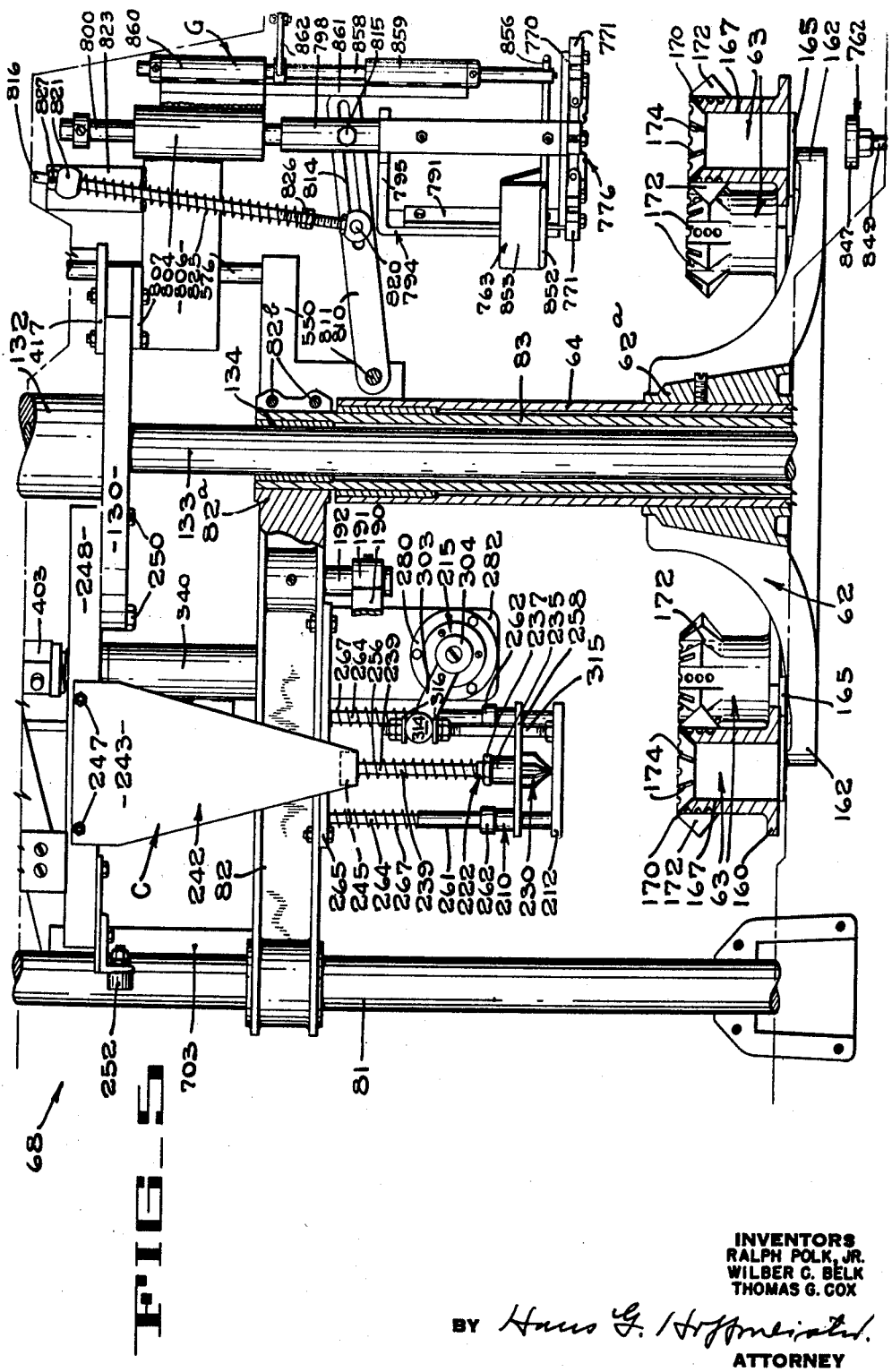

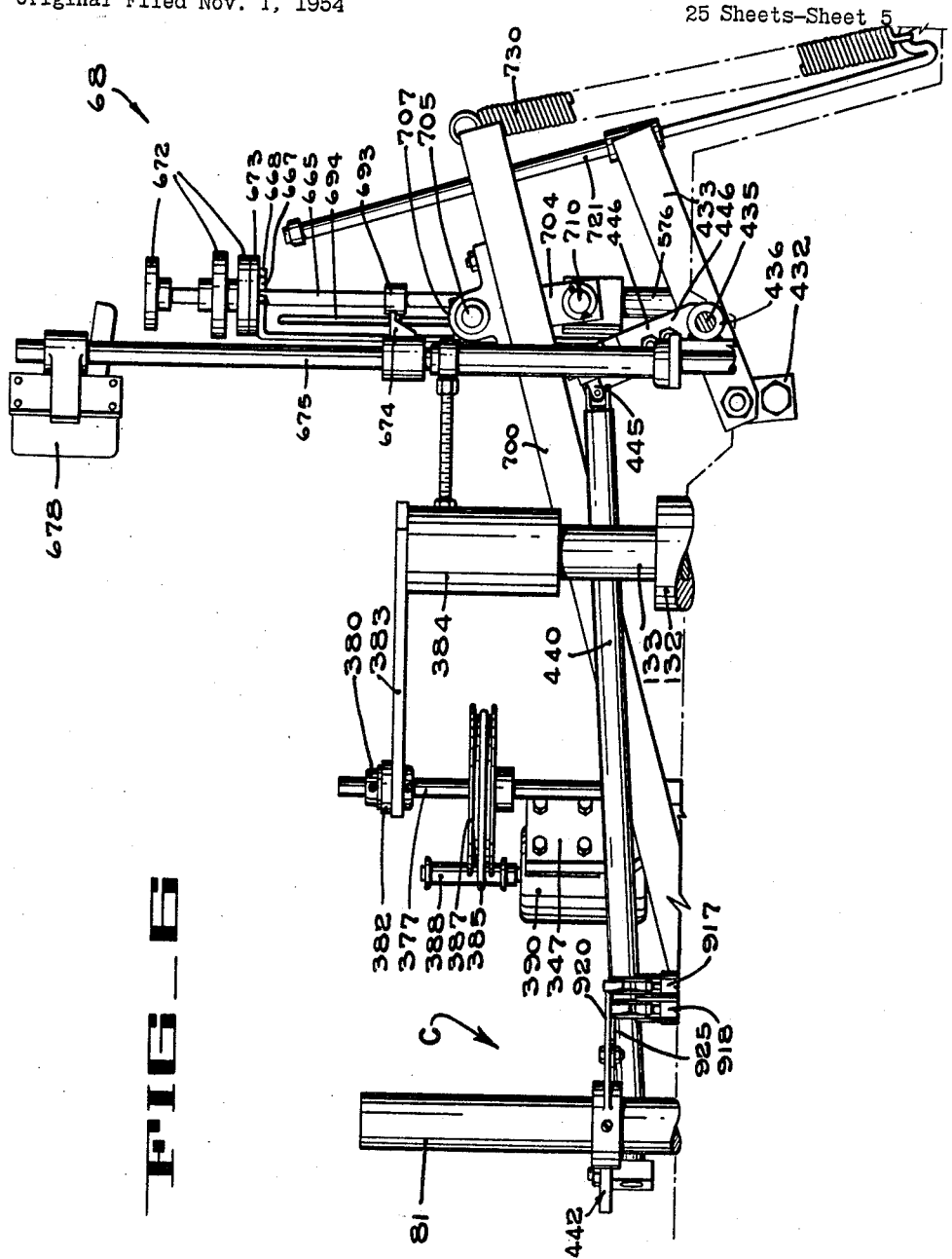

Jan. 15, 1963 R. POLK, JR., ET AL 3,073,365
CITRUS FRUIT PEELING MACHINE
Original Filed Nov. 1, 1954 25 Sheets-Sheet 6
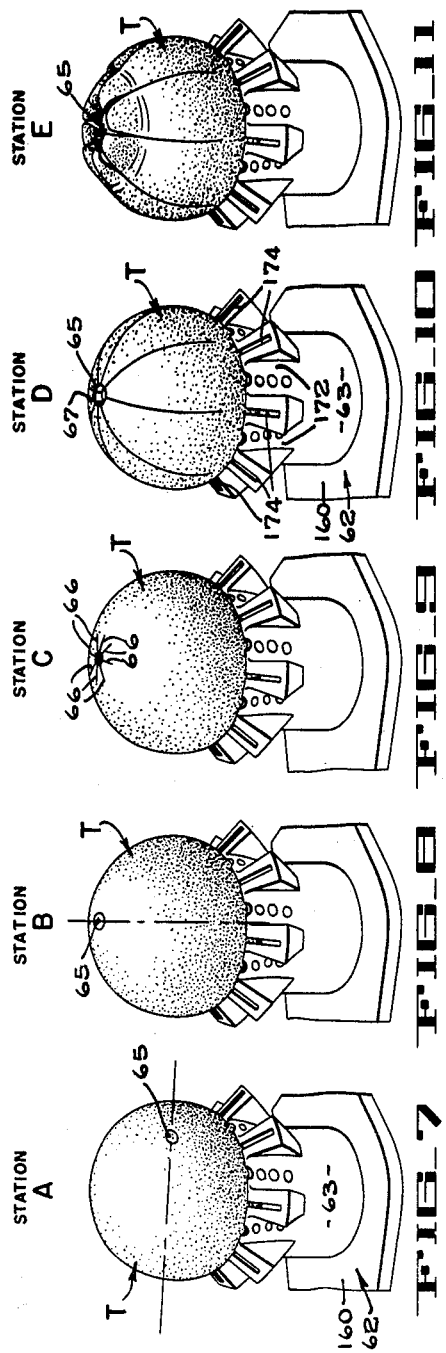
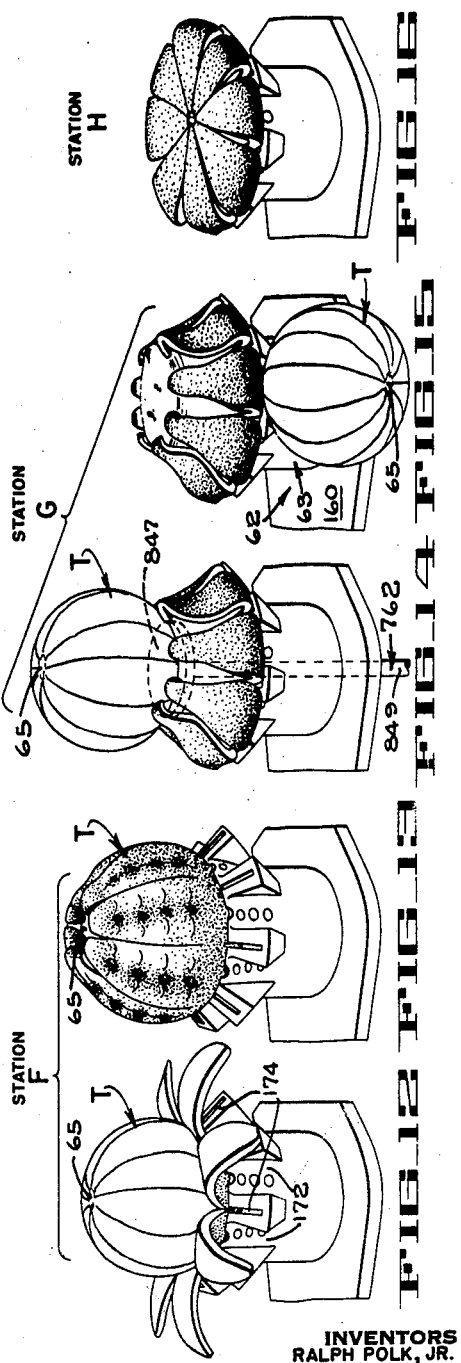
INVENTORS
RALPH POLK, JR.
WILBER C. BELK
THOMAS G. COX
BY
ATTORNEY

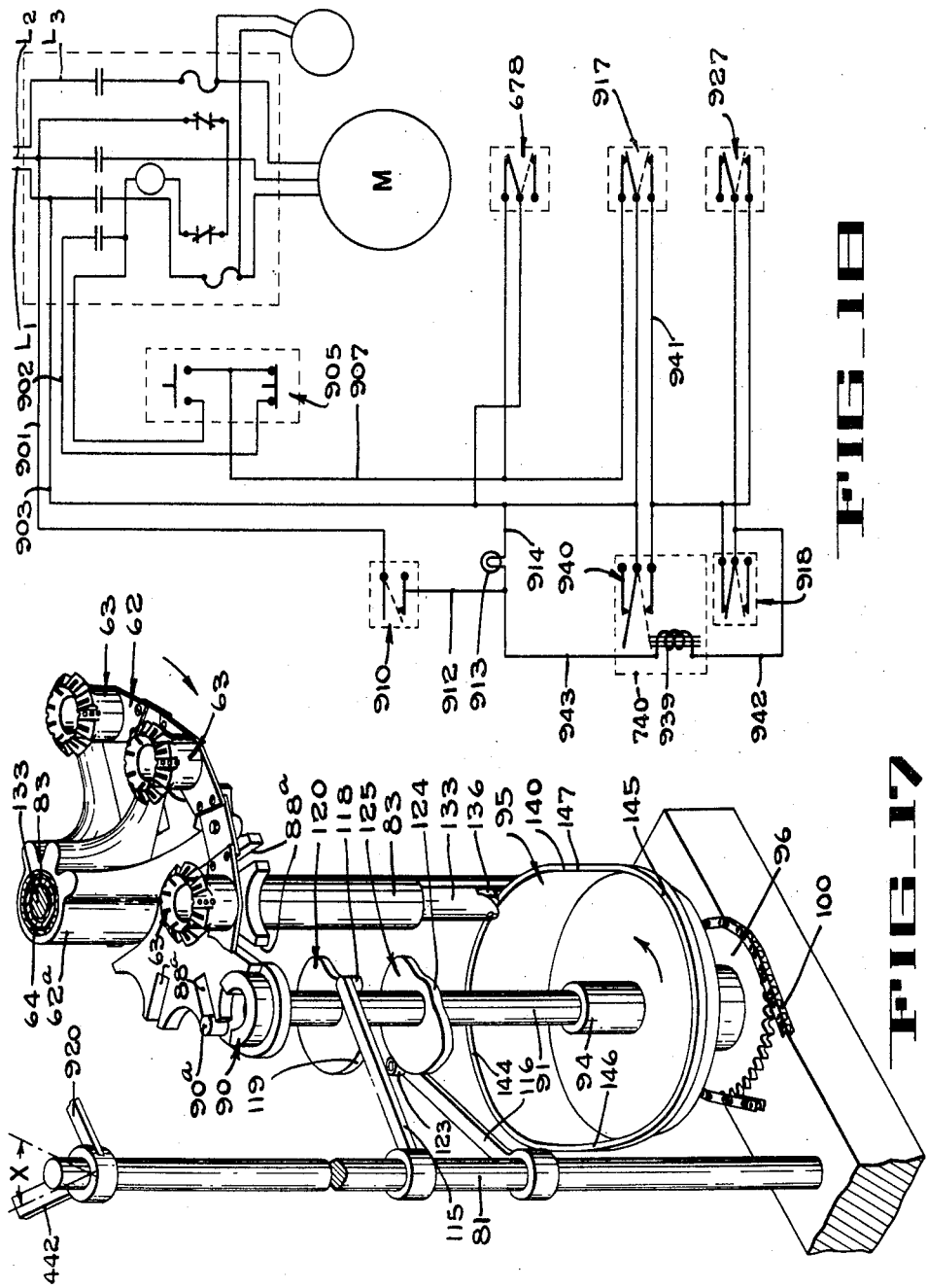

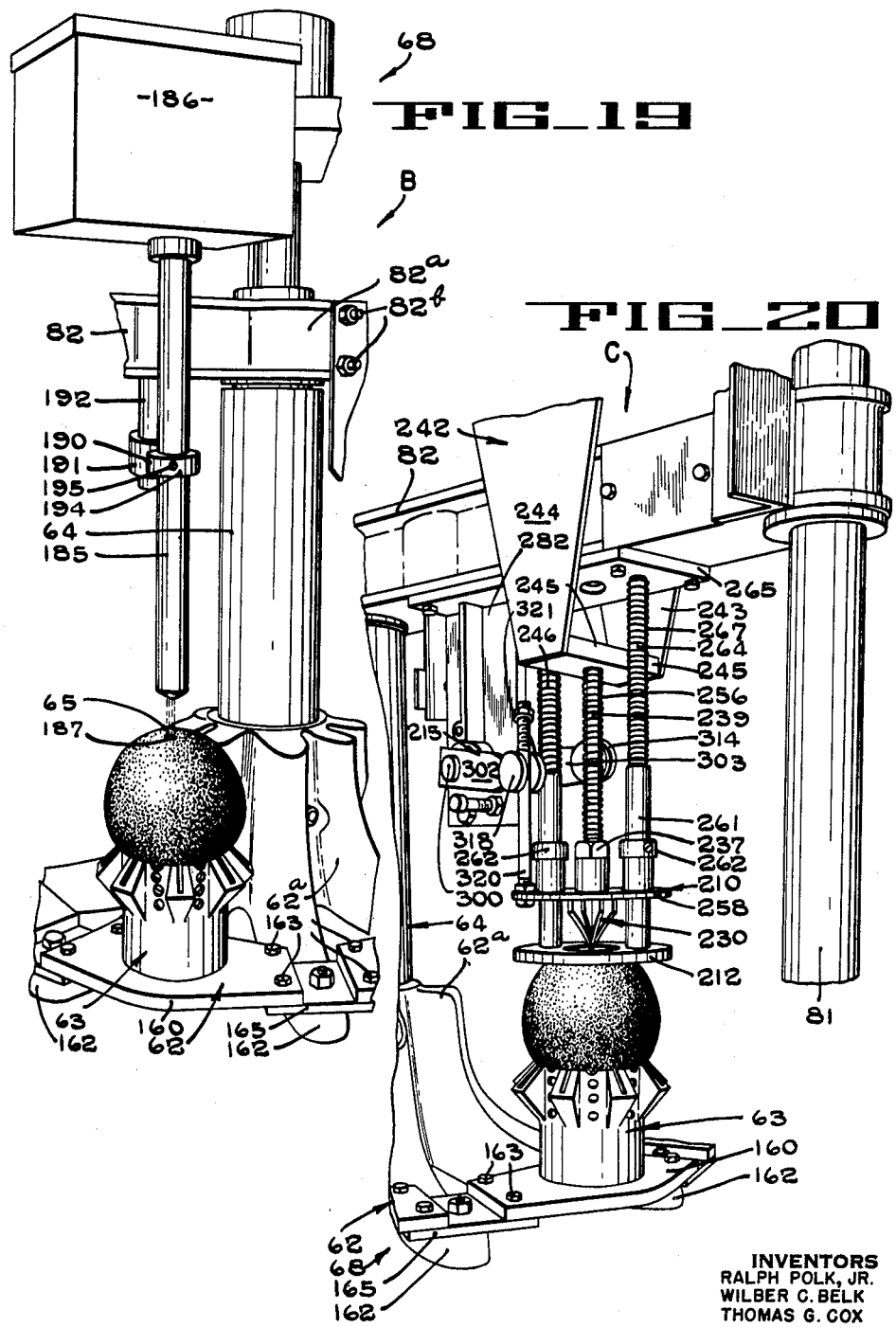

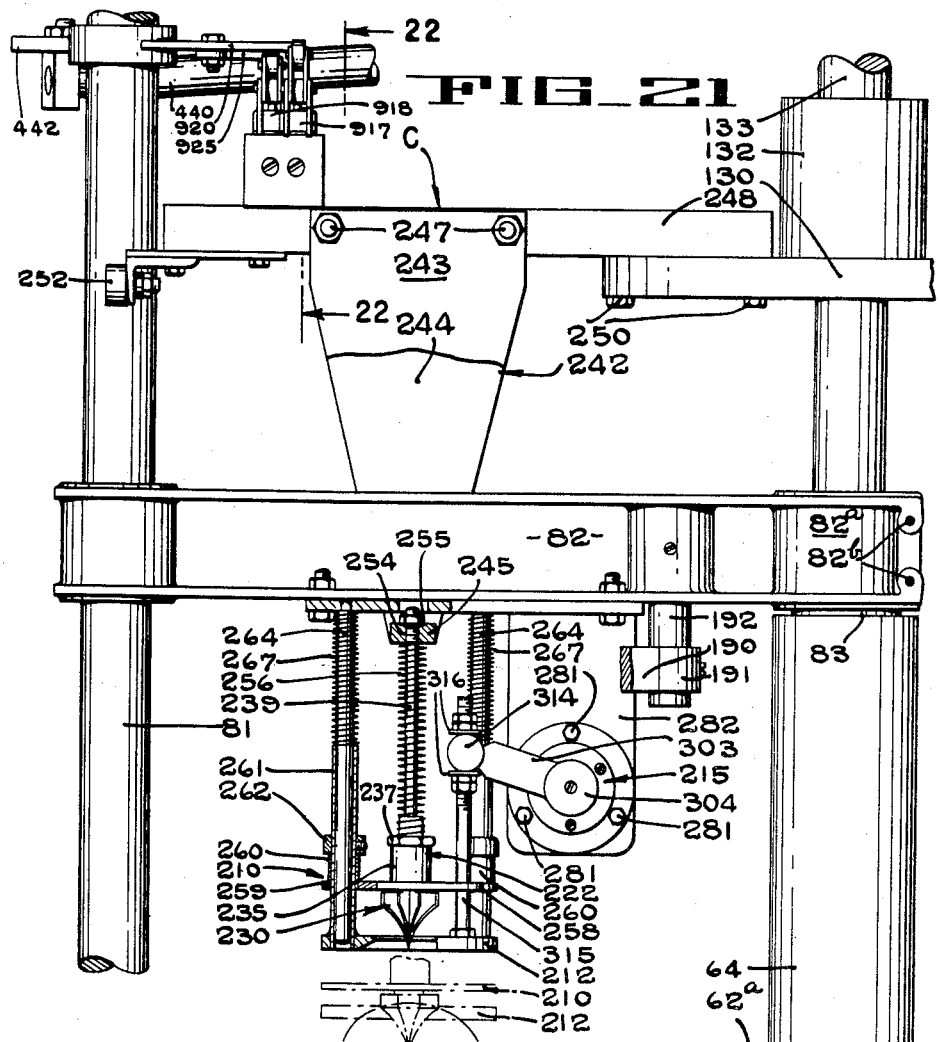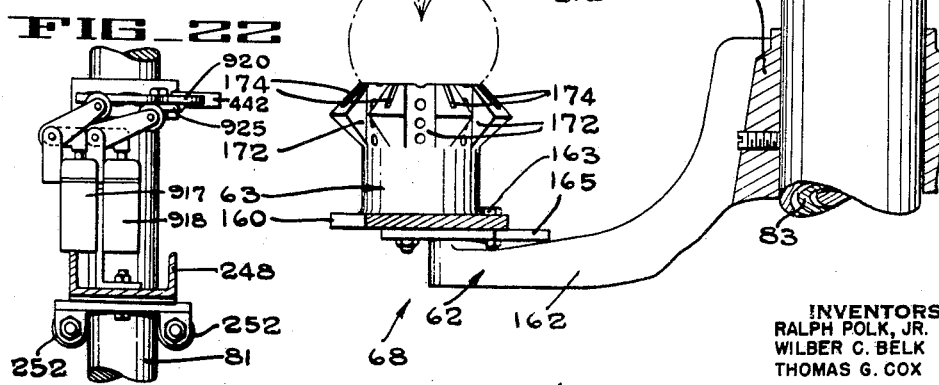

Jan. 15, 1963  R. POLK, JR., ET AL  3,073,365
CITRUS FRUIT PEELING MACHINE
Original Filed Nov. 1, 1954  25 Sheets-Sheet 10
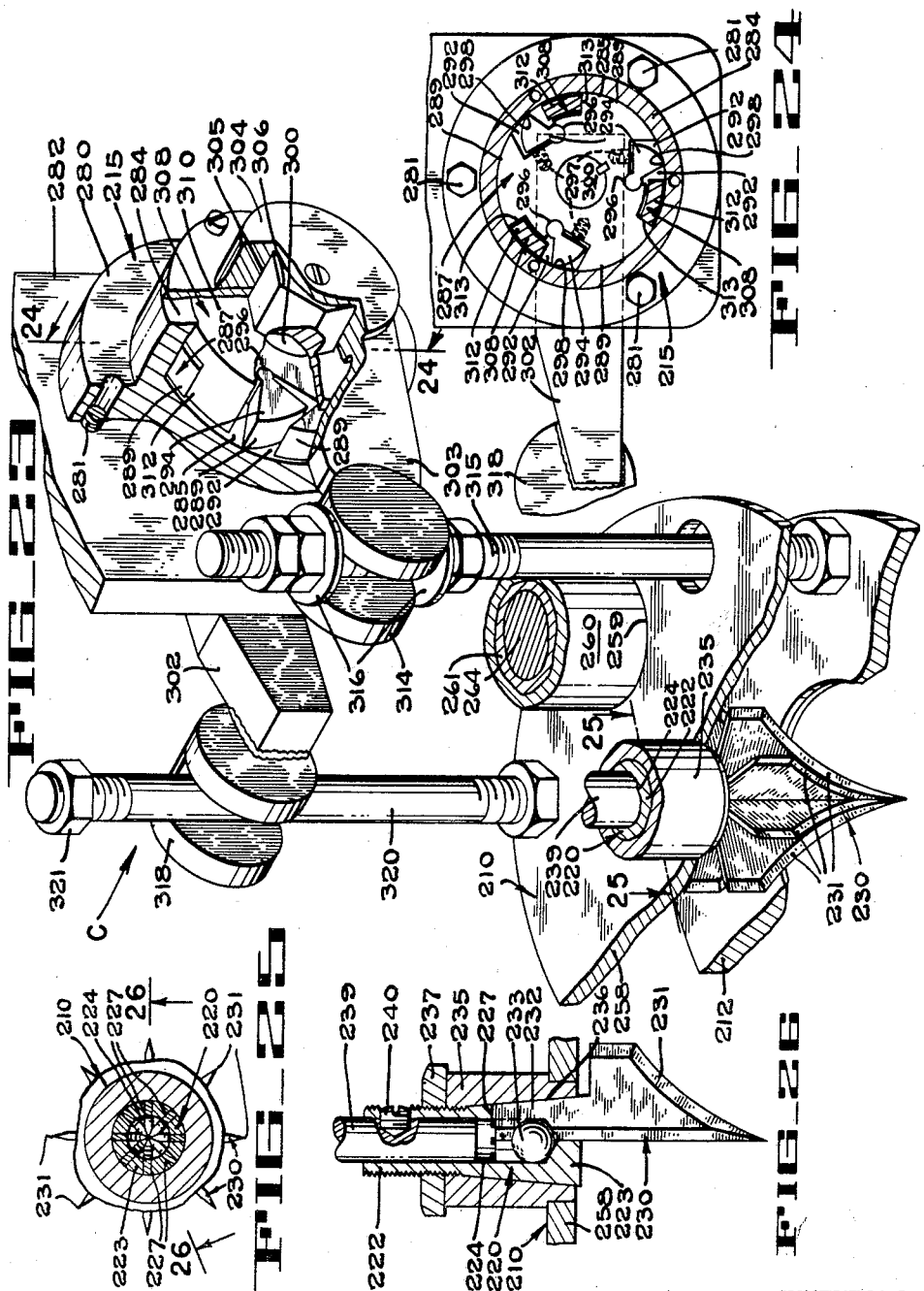
INVENTORS
RALPH POLK, JR.
WILBER C. BELK
THOMAS G. COX
BY Hans G. Hoffmeister
ATTORNEY Jan. 15, 1963    R. POLK, JR., ET AL    3,073,365
CITRUS FRUIT PEELING MACHINE
Original Filed Nov. 1, 1954    25 Sheets-Sheet 11
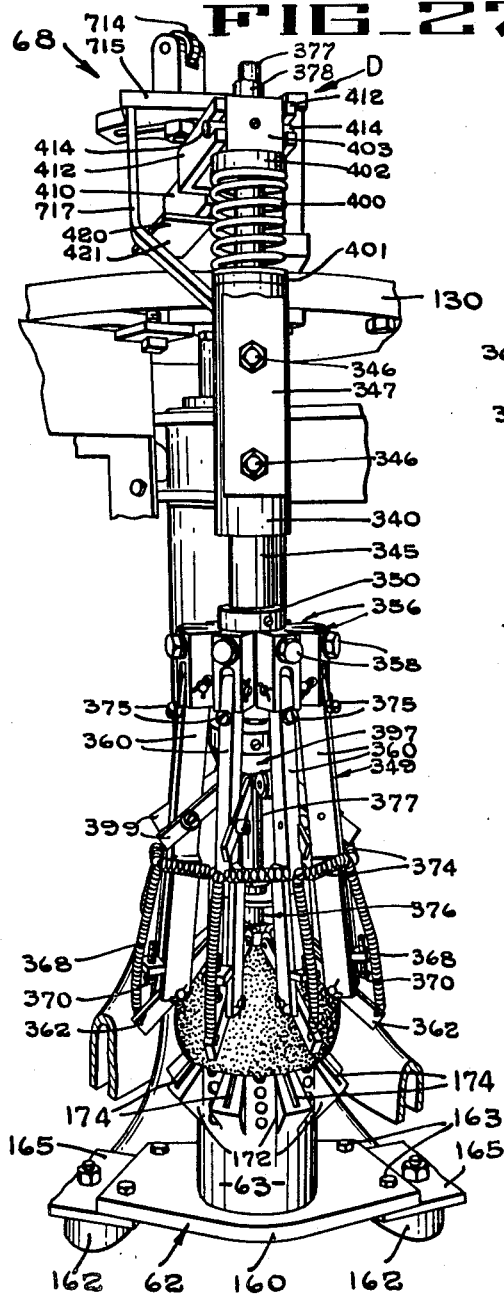
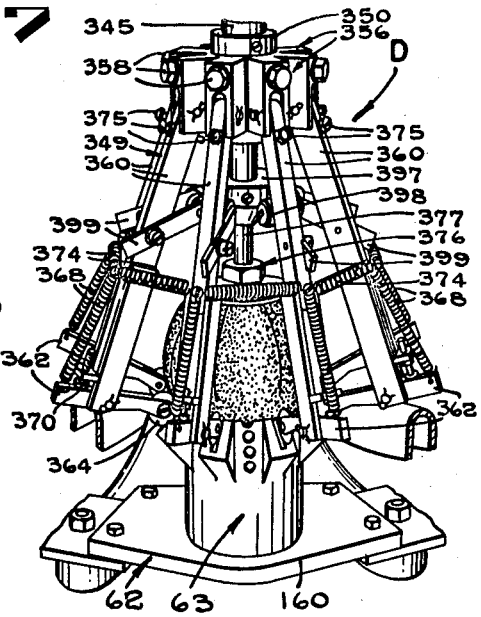
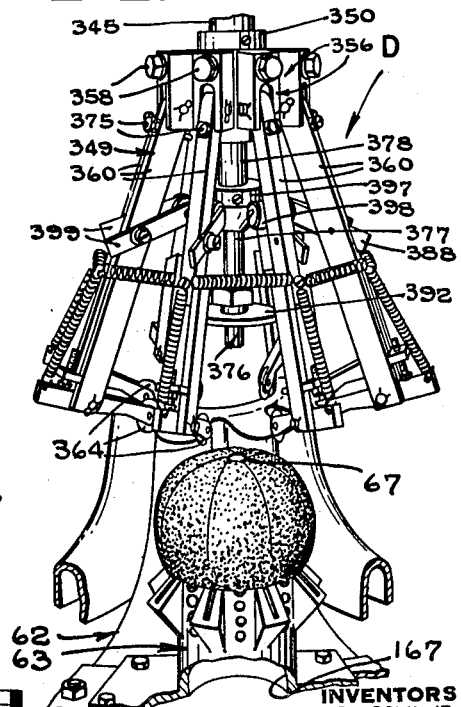
INVENTORS
RALPH POLK, JR.
WILBER C. BELK
THOMAS G. COX
BY *Hans G. Hoffmeister*
ATTORNEY

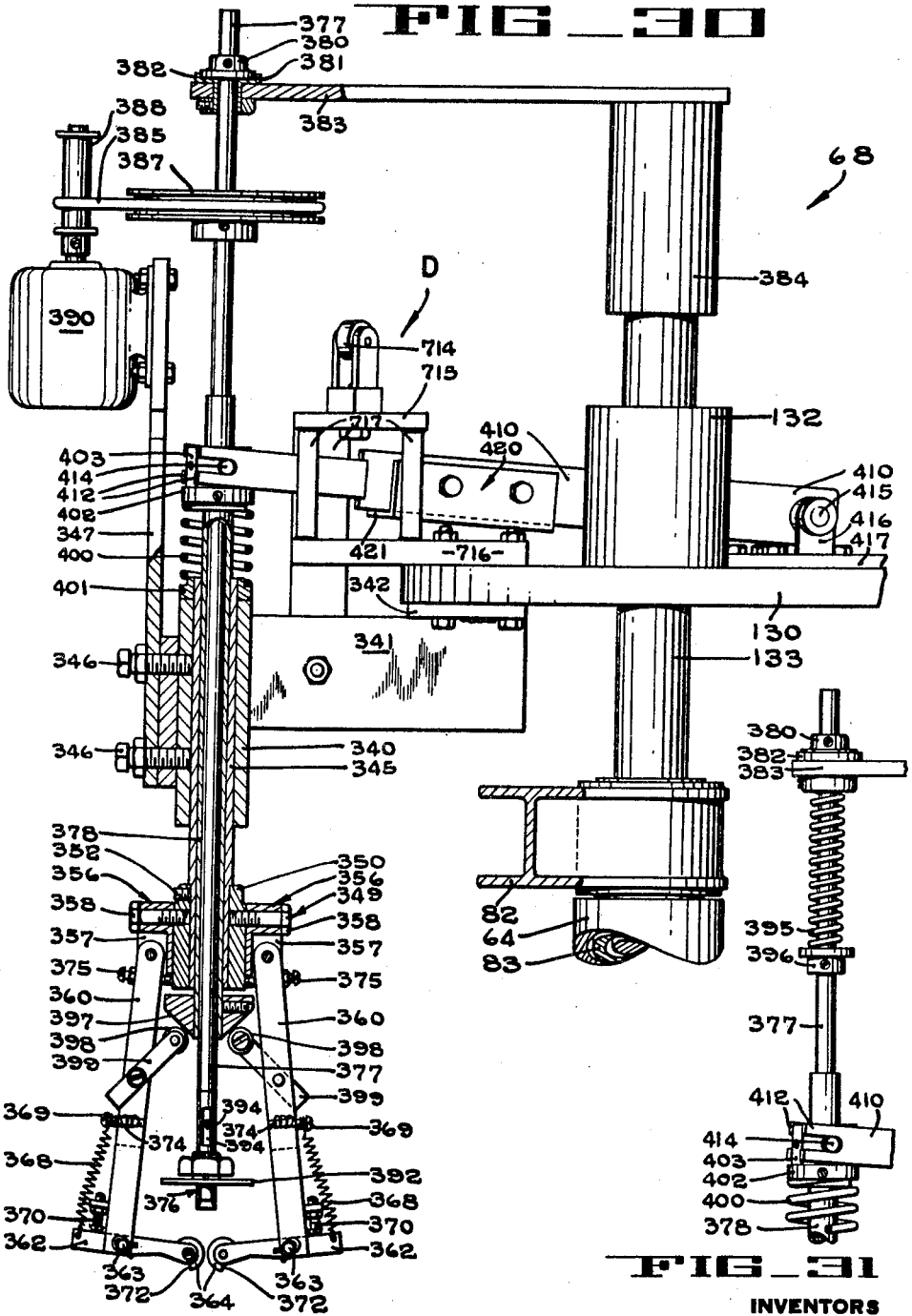

Jan. 15, 1963   R. POLK, JR., ET AL   3,073,365
CITRUS FRUIT PEELING MACHINE
Original Filed Nov. 1, 1954   25 Sheets-Sheet 13
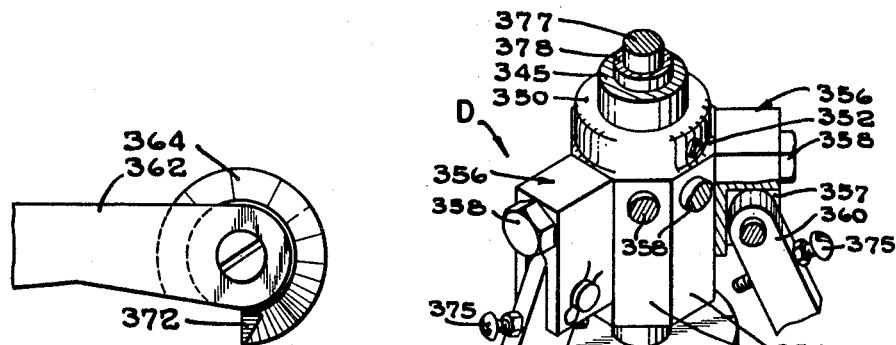
FIG_33
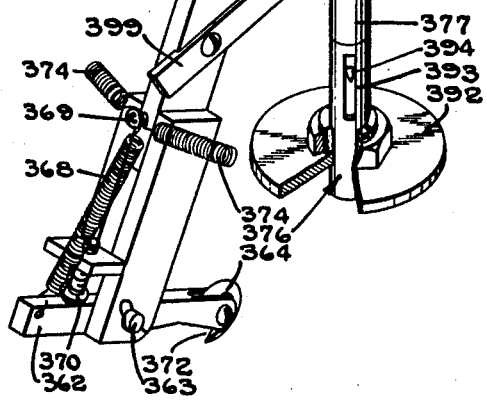
FIG_32
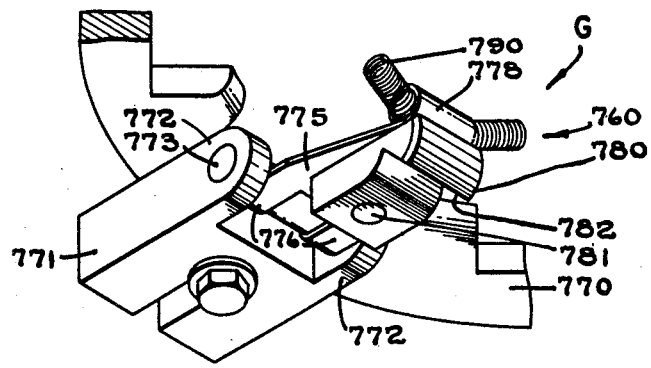
FIG_34
INVENTORS
RALPH POLK, JR.
WILBER G. BELK
THOMAS G. COX
BY Hans G. Hoffmeister
ATTORNEY

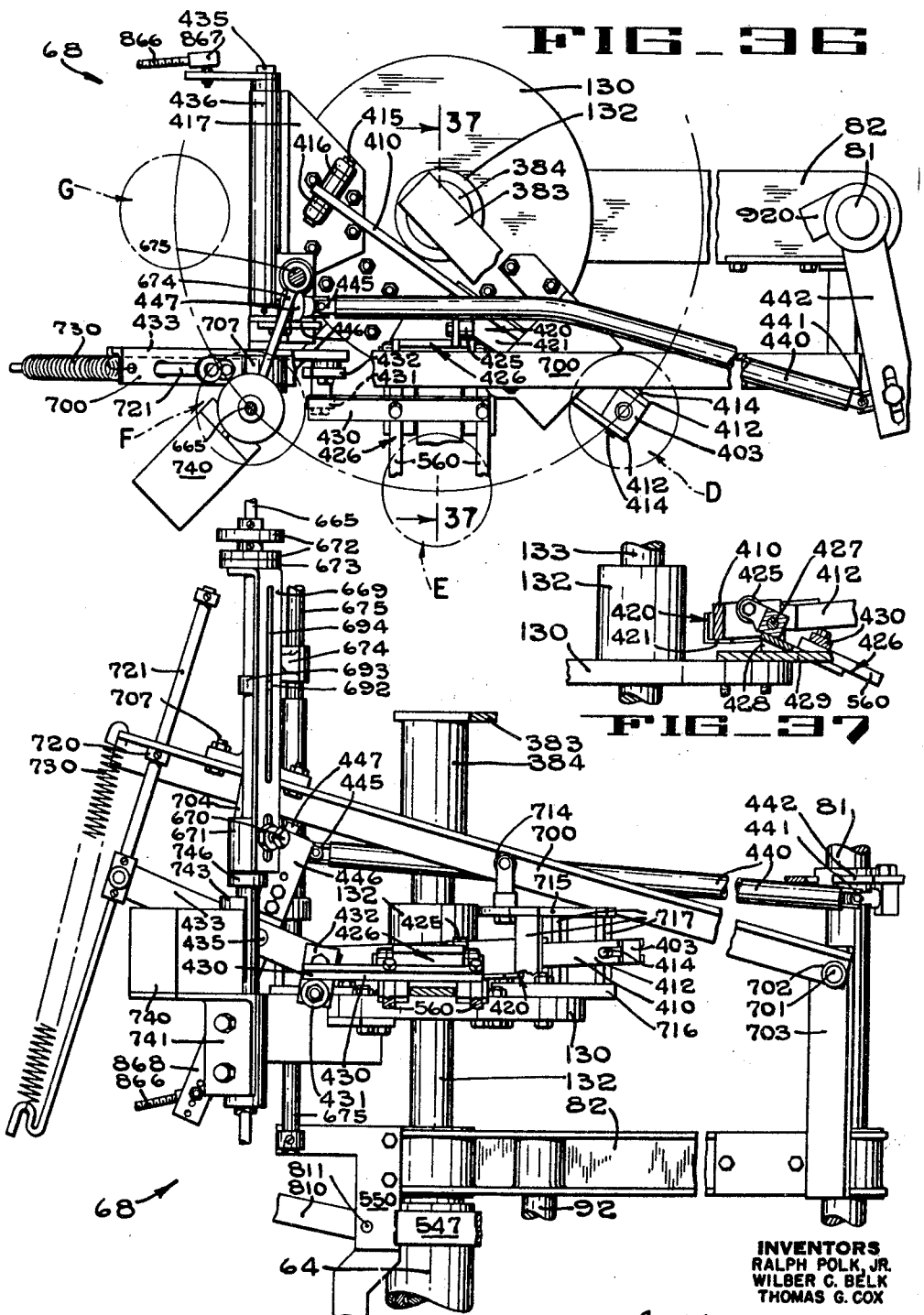

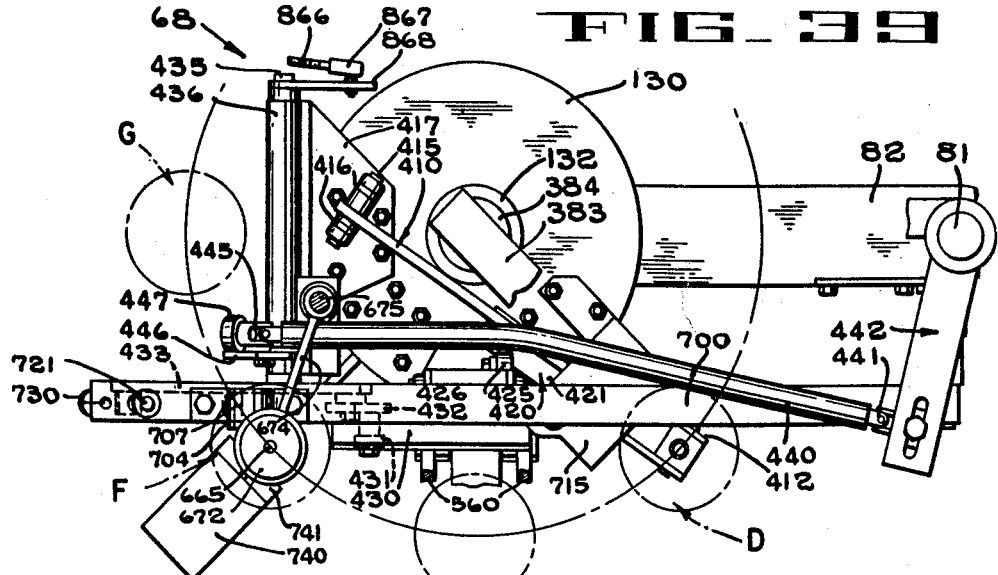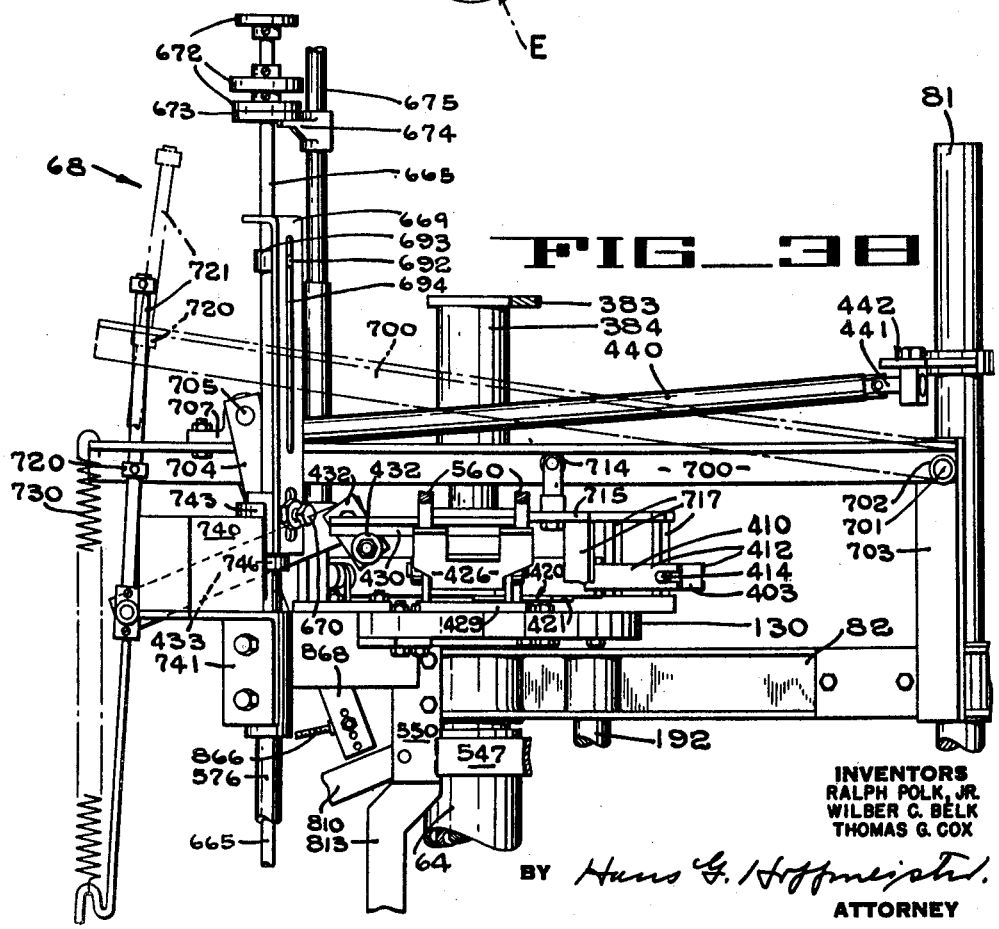

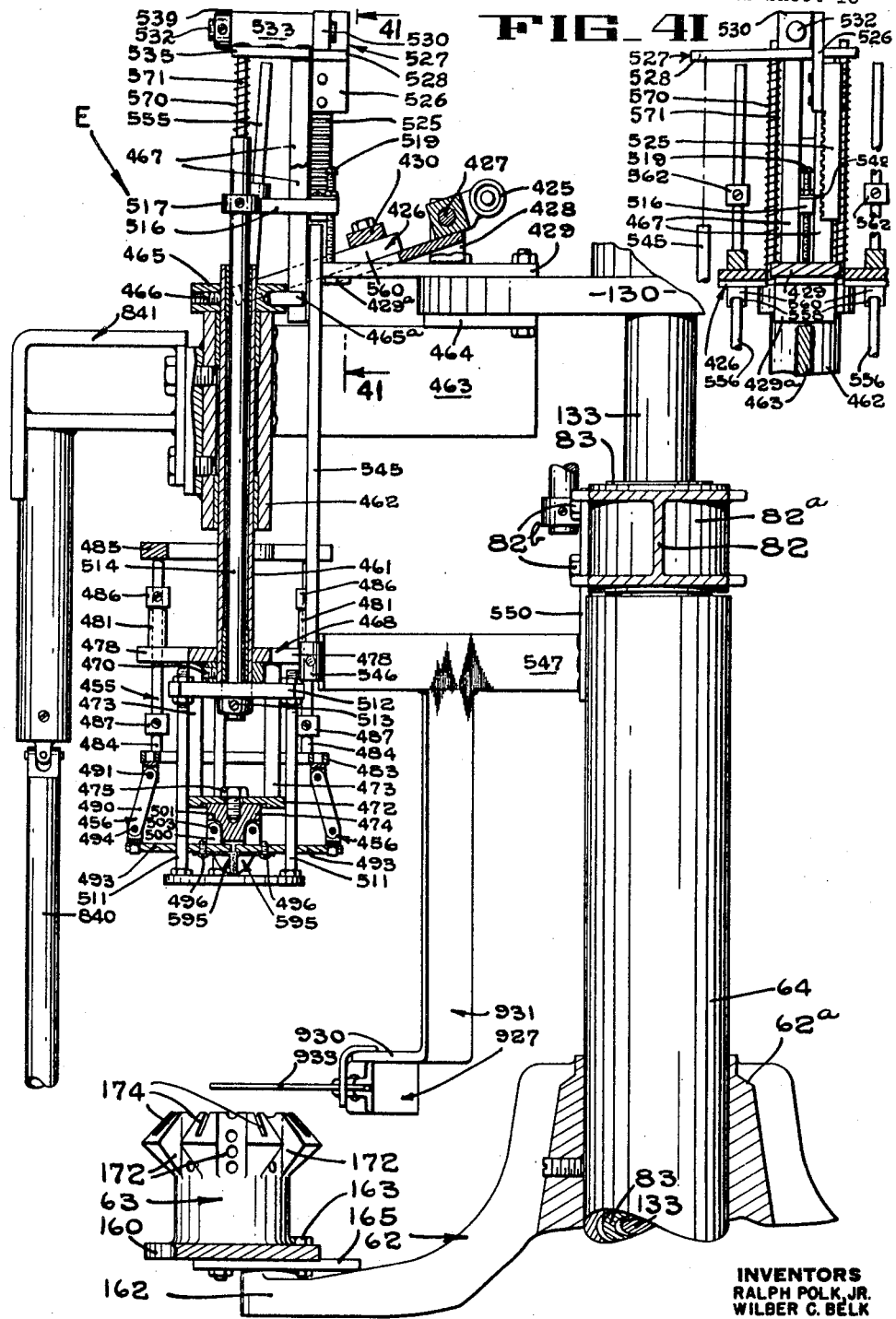

Jan. 15, 1963  R. POLK, JR., ET AL  3,073,365
CITRUS FRUIT PEELING MACHINE
Original Filed Nov. 1, 1954  25 Sheets-Sheet 17
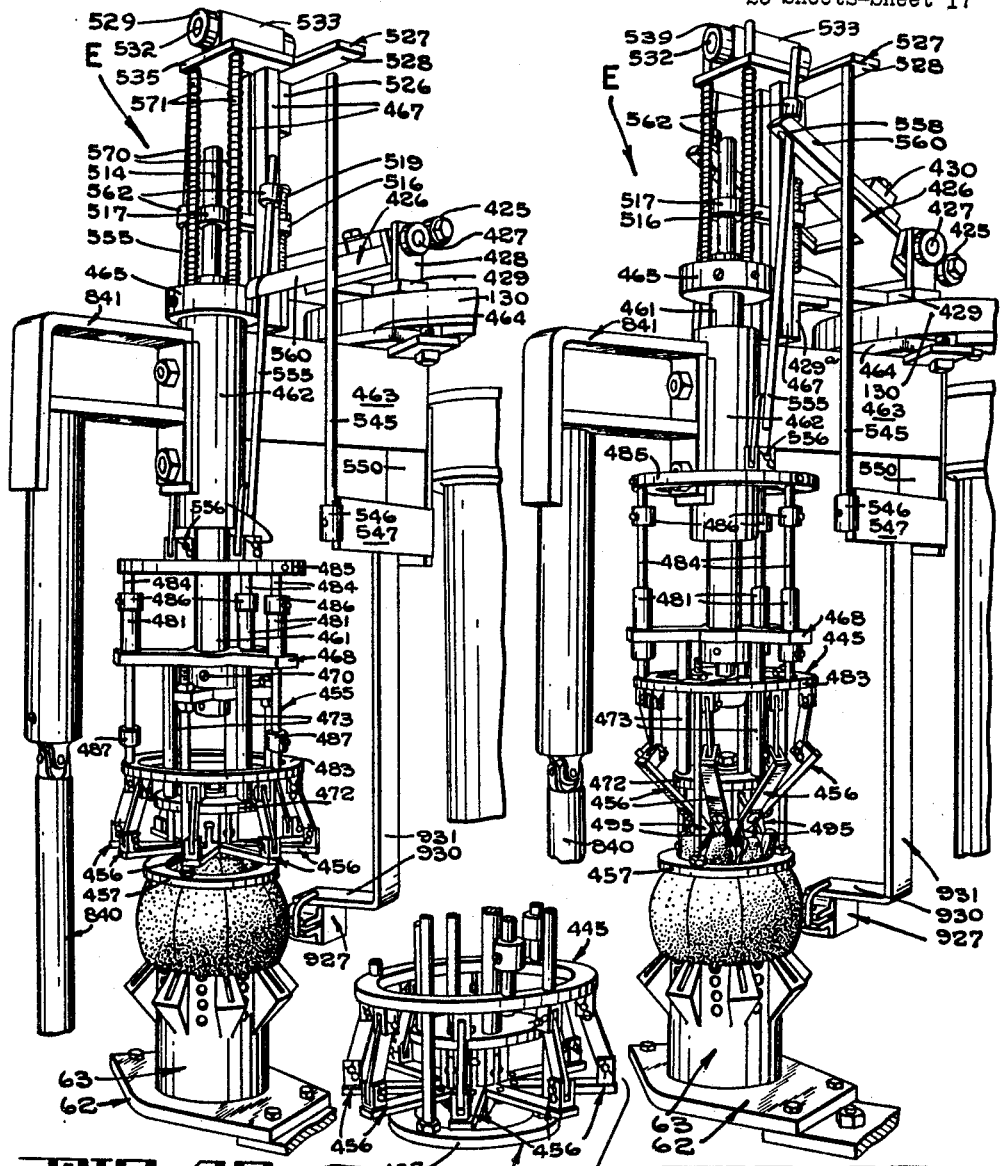
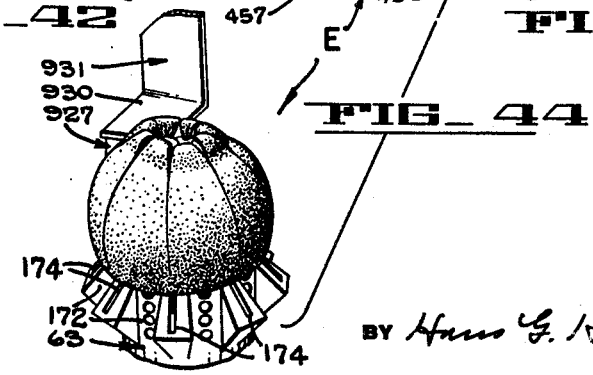
INVENTORS
RALPH POLK, JR.
WILBER C. BELK
THOMAS G. COX
BY Hans G. Hoffmeister
ATTORNEY

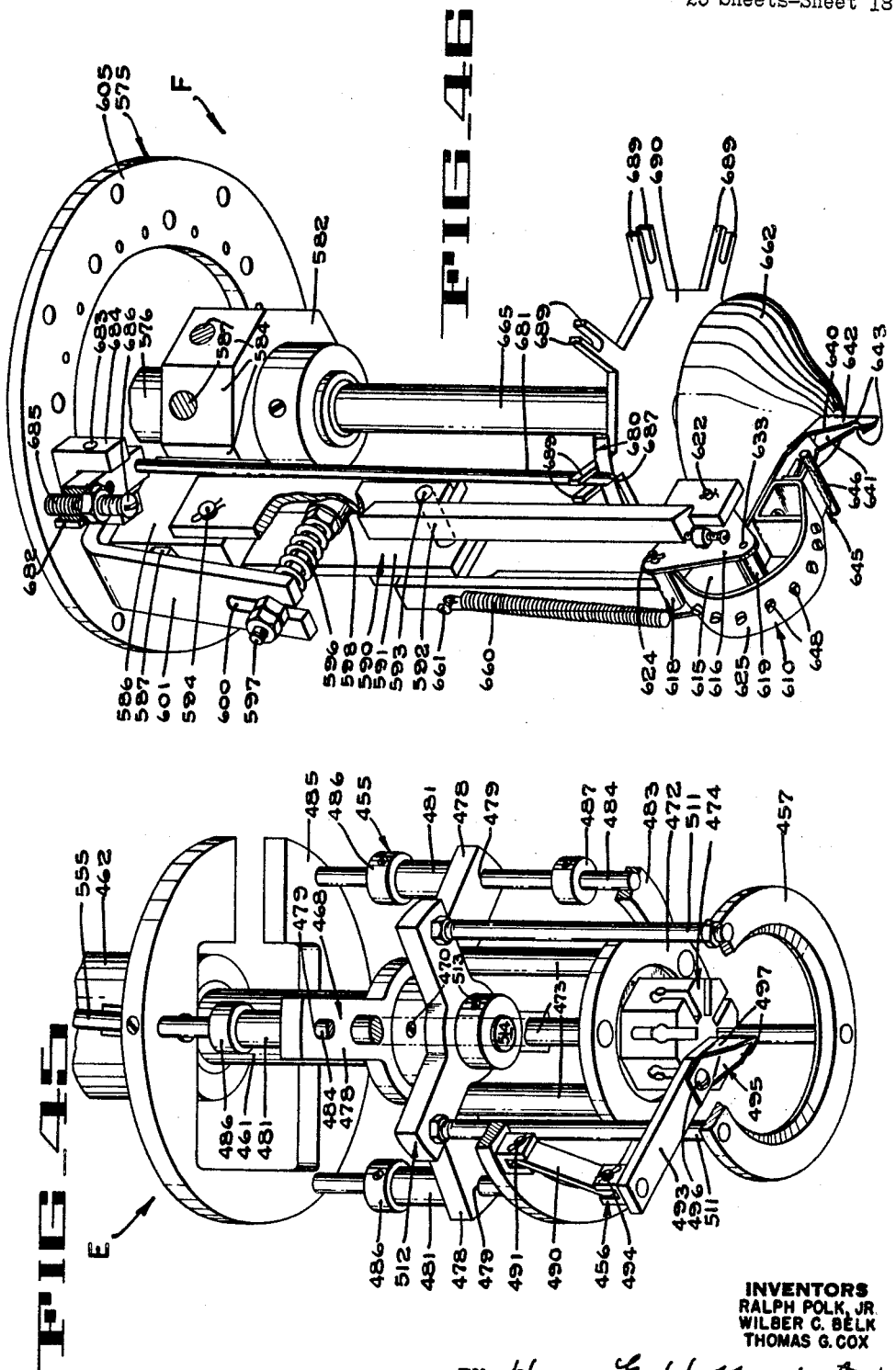

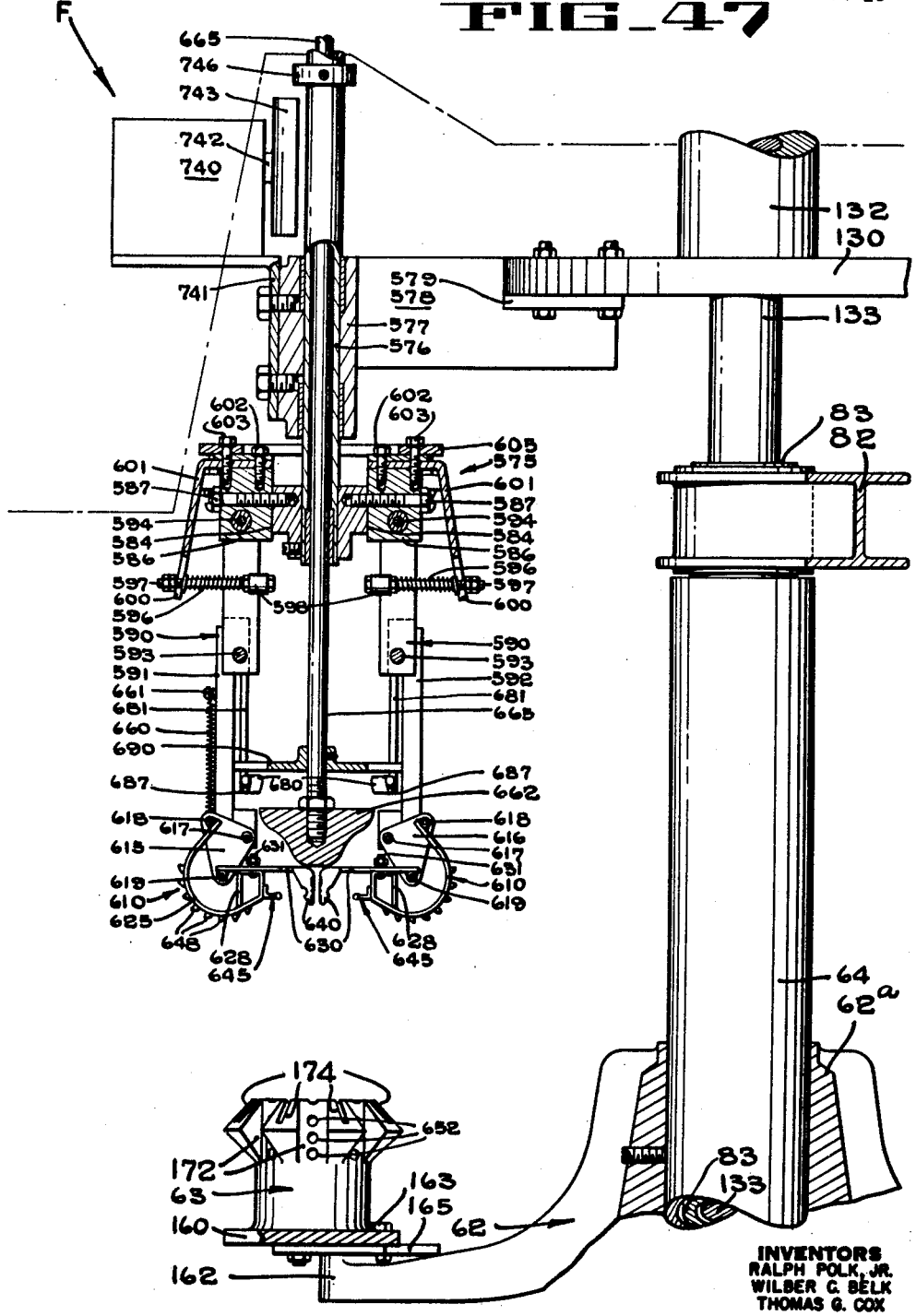

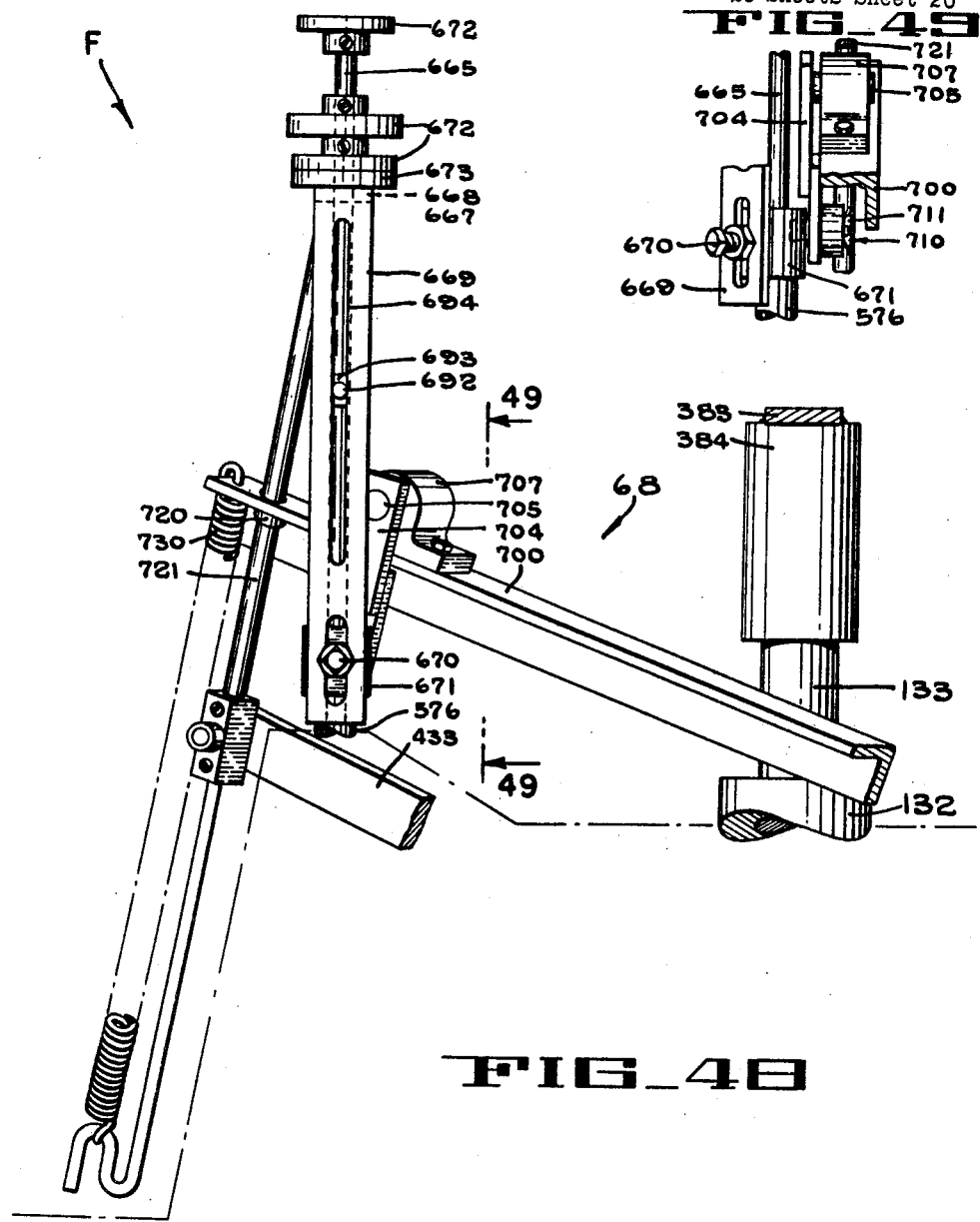

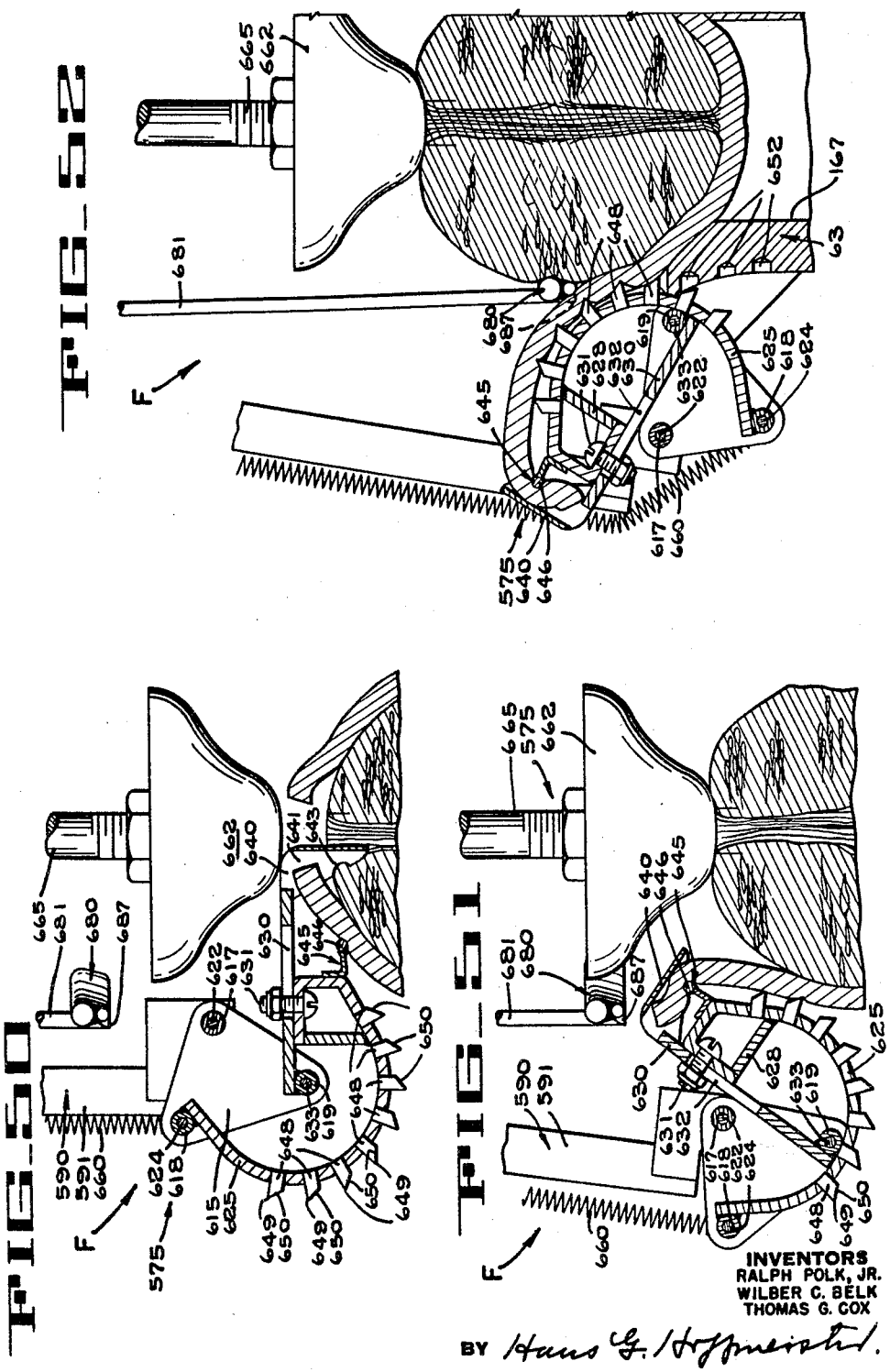

Jan. 15, 1963  R. POLK, JR., ET AL  3,073,365
CITRUS FRUIT PEELING MACHINE
Original Filed Nov. 1, 1954  25 Sheets-Sheet 22
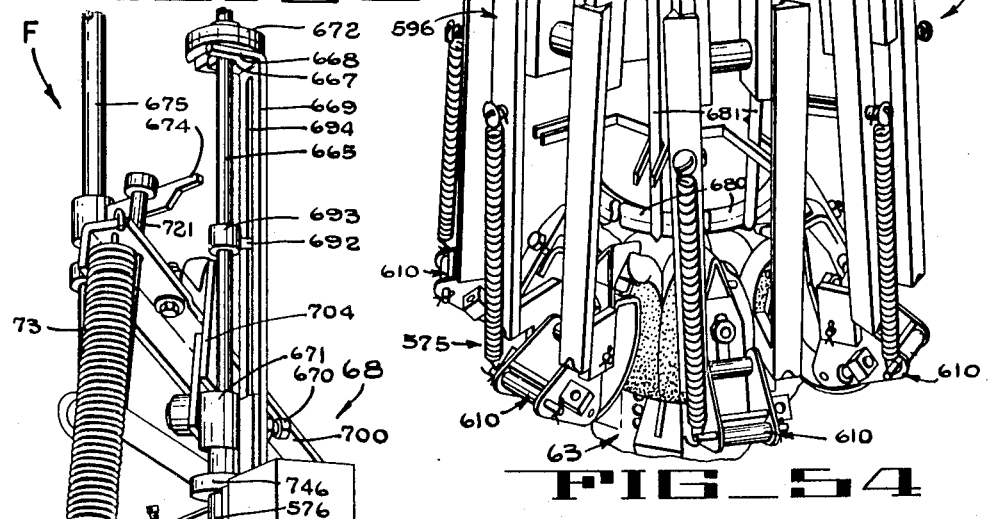
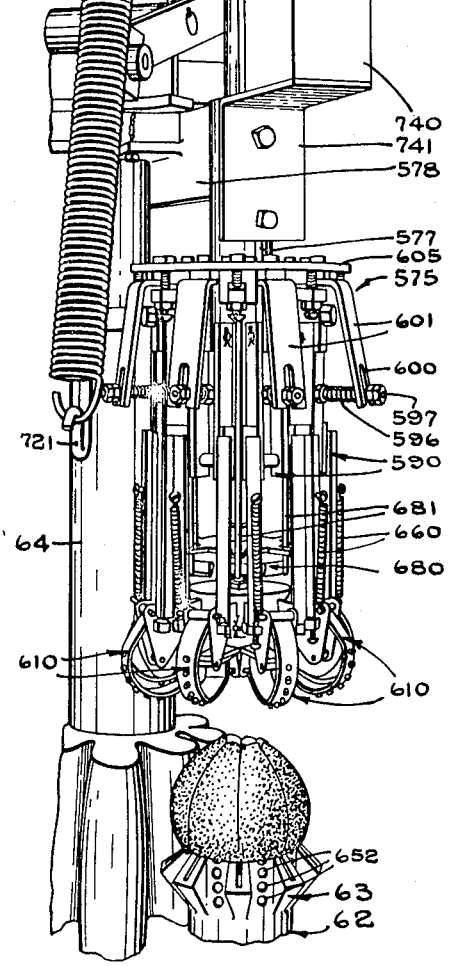
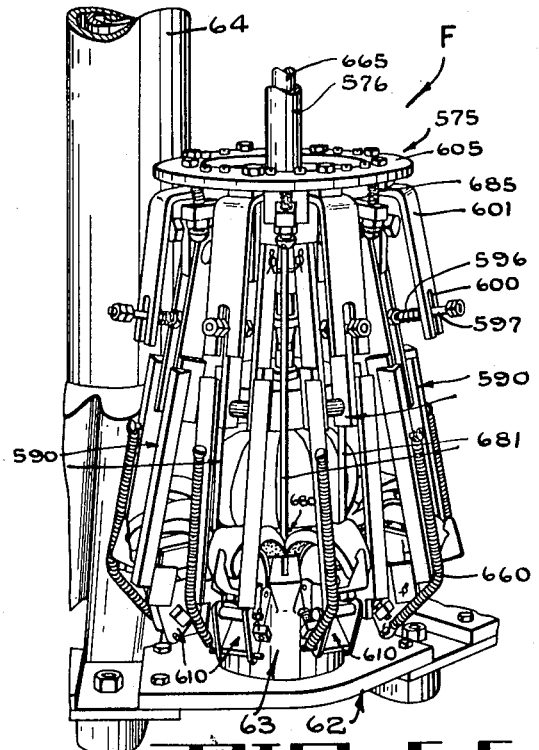
INVENTORS
RALPH POLK, JR.
WILBER C. BELK
THOMAS G. COX
BY Hans G. Hoffmeister
ATTORNEY

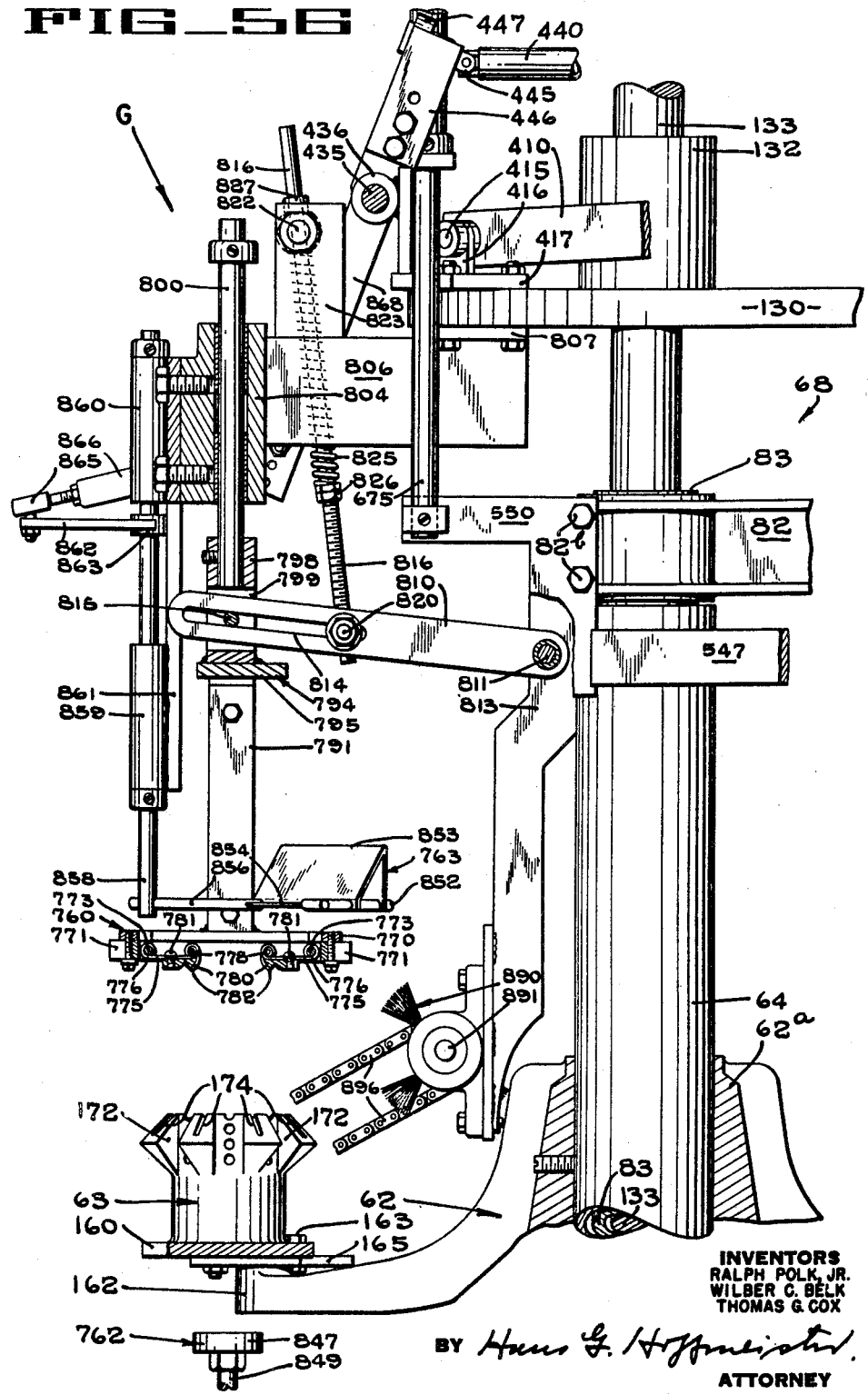

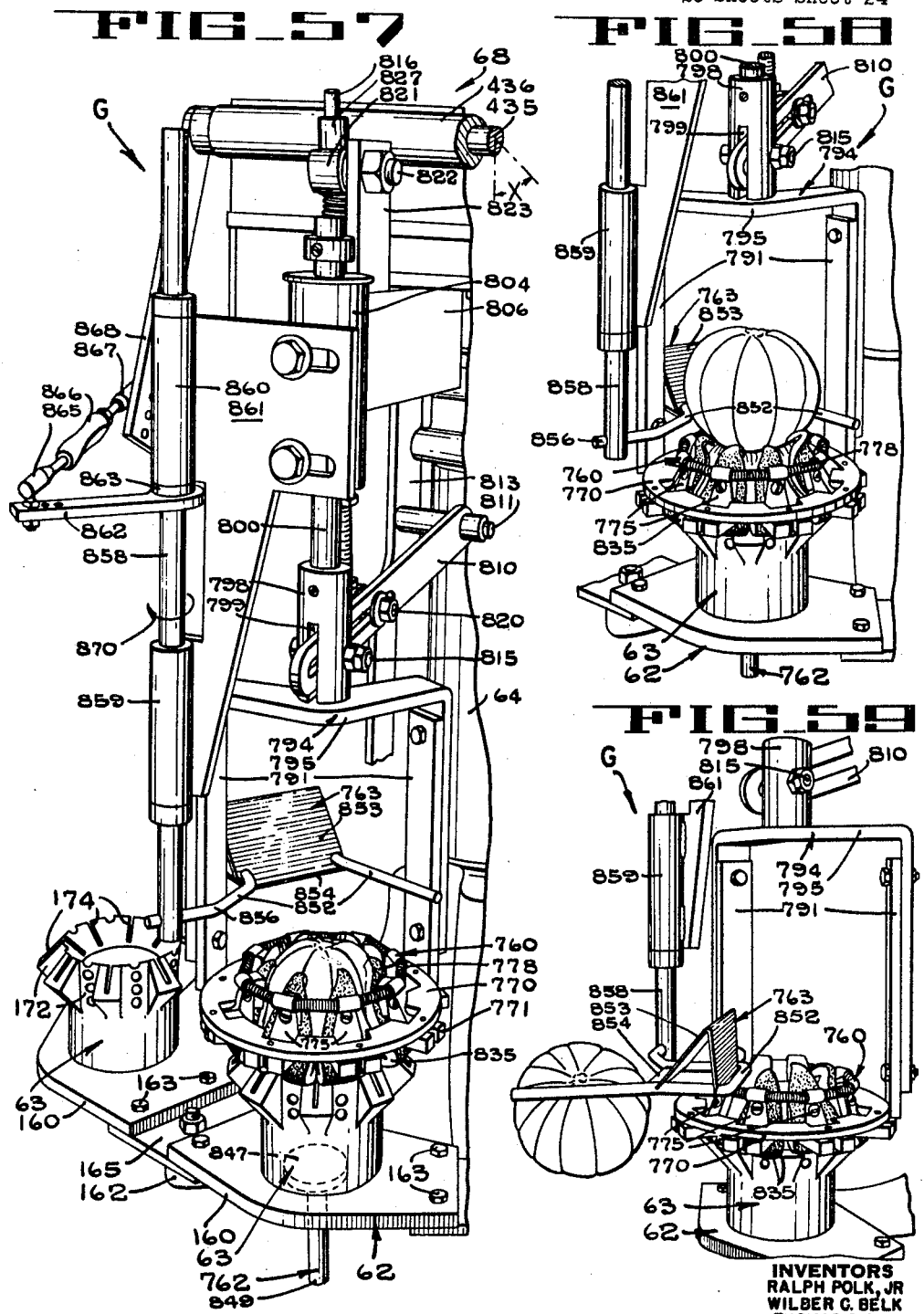

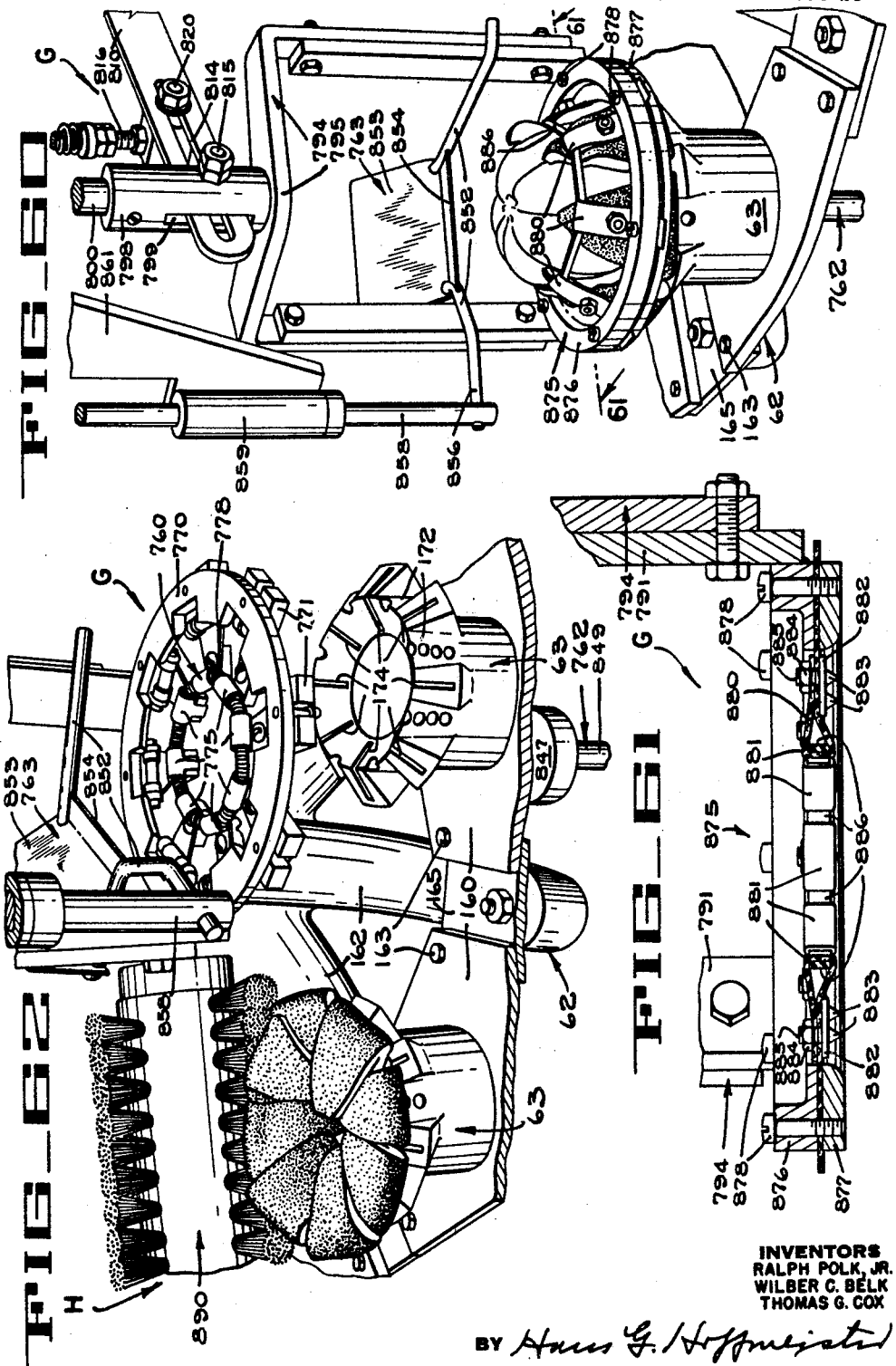

United States Patent Office 3,073,365
Patented Jan. 15, 1963

3,073,365
CITRUS FRUIT PEELING MACHINE
Ralph Polk, Jr., Tampa, and Wilber C. Belk and Thomas G. Cox, Lakeland, Fla.; said Belk and said Cox assignors to FMC Corporation, a corporation of Delaware
Original application Nov. 1, 1954, Ser. No. 466,104, now Patent No. 2,958,356, dated Nov. 1, 1960. Divided and this application Oct. 30, 1958, Ser. No. 770,755
32 Claims. (Cl. 146—3)

This invention pertains to apparatus for processing fruit and more particularly relates to an improved machine for removing peel from citrus fruit, and to an improved apparatus for carrying out the method.

While the peeling method of the present invention may be used in the processing of a variety of citrus fruit, it is particularly effective in processing grapefruit. Accordingly, in the following specification an apparatus for peeling grapefruit will be disclosed as a preferred embodiment of the invention.

This application is a division of copending application Serial No. 466,104 filed November 1, 1954, now Patent No. 2,958,356.

An object of the present invention is to provide an improved machine for removing the peel from a grapefruit or the like without damaging or causing ruptures in the meat portion of the grapefruit underlying the peel.

Another object is to provide a novel mechanism for slitting the peel of a grapefruit into a predetermined number of peel segments.

Another object is to provide an improved means for drawing a peel segment away from the meat of the grapefruit after the peel has been slit into segments.

Another object is to provide an efficient means for separating a grapefruit body from loosened peel segments.

Another object is to provide a novel mechanism for ejecting the peeled grapefruit from the supporting cup.

Another object is to provide an efficient means for removing the separated peel from the supporting cup after the peeled grapefruit has been ejected.

Other and further objects and advantages of the present invention will become apparent from the following description taken in connection with the accompanying drawings.

FIG. 1 is a perspective view of the grapefruit peeling machine of the present invention looking at the feed side of the machine, and particularly showing the various fruit processing stations.

FIG. 2 is a perspective view of the grapefruit peeling machine of FIG. 1, looking at the side of the machine opposite to that shown in FIG. 1.

FIG. 3 is an enlarged plan view of the grapefruit peeling machine of FIG. 1.

FIG. 4 is a section of approximately the lower one-third of the machine taken along line 4—4 of FIG. 3.

FIG. 5 is a section of the middle one-third of the machine taken along line 4—4 of FIG. 3.

FIG. 6 is a section of the upper one-third of the machine taken along line 4—4 of FIG. 3.

FIGS. 7 to 16, inclusive, are diagrammatic perspectives particularly illustrating the operation performed on the grapefruit at the various processing stations.

FIG. 17 is an enlarged fragmentary perspective of the main drive mechanism of the grapefruit peeling machine of the present invention.

FIG. 18 is a schematic wiring diagram of the electrical control system used in the present grapefruit peeling machine.

FIG. 19 is an enlarged fragmentary perspective view of the mechanism at the grapefruit aligning station, looking in the direction of arrows 19—19 of FIG. 3.

FIG. 20 is an enlarged fragmentary perspective of the apparatus disposed at the stem end splitting station, the view being taken looking in the direction of arrows 20—20 of FIG. 3.

FIG. 21 is an enlarged fragmentary section through station C, taken on line 21—21 of FIG. 3.

FIG. 22 is an enlarged vertical section taken along line 22—22 of FIG. 21.

FIG. 23 is an enlarged fragmentary perspective, partly broken away and partly in section, of the stem splitting apparatus, particularly illustrating the fixture lock utilized at this station.

FIG. 24 is a fragmentary section taken on line 24—24 of FIG. 23.

FIG. 25 is a horizontal section taken on line 25—25 of FIG. 23.

FIG. 26 is a vertical section taken along line 26—26 of FIG. 25.

FIG. 27 is an enlarged fragmentary perspective of the apparatus at the peel cutting station, the view being taken looking in the direction of arrows 27—27 of FIG. 3.

FIGS. 28 and 29 are fragmentary perspectives, similar to FIG. 27, but showing the apparatus in successive operating positions.

FIG. 30 is an enlarged vertical section taken at the peel cutting station along line 30—30 of FIG. 3.

FIG. 31 is a fragmentary side elevation of a modified tubular cutter that may be used with the apparatus of FIG. 30.

FIG. 32 is an enlarged fragmentary perspective of a portion of the peel cutting apparatus.

FIG. 33 is a side elevation of the cutter shown in FIG. 32.

FIG. 34 is an enlarged fragmentary perspective of a portion of an elastic ring used at the fruit and peel separating station.

FIG. 35 is an enlarged fragmentary side elevation of the overhead secondary actuating mechanism used in the present grapefruit peeling machine, viewed from the fruit feeding side of the machine.

FIG. 36 is a plan of the apparatus shown in FIG. 35.

FIG. 37 is a section taken along line 37—37 of FIG. 36.

FIG. 38 is a fragmentary side elevation of the secondary actuating mechanism, similar to FIG. 35, but showing another operating position of the machanism.

FIG. 39 is a plan of the apparatus of FIG. 38.

FIG. 40 is an enlarged fragmentary section of the apparatus at the peel lifting station, taken along line 40—40 of FIG. 3.

FIG. 41 is a section taken along line 41—41 of FIG. 40.

FIGS. 42, 43 and 44 are enlarged fragmentary perspectives of the apparatus at the peel lifting station showing successive operating positions of the apparatus, the views being taken looking in the direction of arrows 42—42 of FIG. 3.

FIG. 45 is an enlarged fragmentary perspective, with parts broken away and parts in section, of the peel opening apparatus used at the peel lifting station.

FIG. 46 is an enlarged fragmentary perspective, with parts in section and parts broken away, of a stripper assembly used at the peel stripping station.

FIG. 47 is an enlarged fragmentary section of the lower portion of the stripper apparatus at the peel stripping station and taken along line 47—47 of FIG. 3.

FIG. 48 is an enlarged fragmentary section, taken along the same line 47—47 of FIG. 3, of the upper portion of the stripper mechanism.

FIG. 49 is a section taken along line 49—49 of FIG. 48.

FIGS. 50, 51 and 52 are enlarged fragmentary sections taken through a stripper head showing successive operating positions of the head as it removes a peeled segment from the grapefruit.

FIGS. 53, 54 and 55 are enlarged fragmentary perspectives of the stripper mechanism showing successive operating positions of the stripper mechanism, the views being taken looking in the direction of arrows 53—53 of FIG. 3.

FIG. 56 is an enlarged vertical section taken at the fruit and peel separating station along line 56—56 of FIG. 3.

FIGS. 57, 58 and 59 are enlarged fragmentary perspectives of the mechanism at the fruit and peel separating station showing successive operating positions of the mechanism, the views being taken looking in the direction of arrows 57—57 of FIG. 3.

FIG. 60 is an enlarged fragmentary perspective of a modified form of the elastic ring used to slide the loosened peel from the grapefruit, the view also being taken looking in the direction of arrows 57—57 of FIG. 3.

FIG. 61 is an enlarged section taken along line 61—61 of FIG. 60.

FIG. 62 is an enlarged fragmentary perspective of the mechanism particularly showing the brush at the peel discharge station for removing the peel from the supporting cup, the view being taken looking in the direction of arrows 62—62 of FIG. 3.

General Construction and Operation

Before entering into a detailed description of the illustrated embodiment of the present invention, the following brief description will assist in an understanding of the general arrangement and operation of the machine. In FIGURES 1, 2 and 3 the reference number 62 indicates a turret having eight equally spaced fruit-supporting cups 63 mounted thereon. The turret 62 has a central hub portion 62a (FIG. 5) keyed to a tubular shaft 64 which is arranged to be intermittently indexed about its axis in one-eighth of a revolution increments to move each cup in a clockwise direction (FIG. 3) from fruit-receiving station A, through successive fruit processing stations B, C, D, E, F and G, to station H at which the peel which has been separated from the body portion of the grapefruit is discharged from the cup.

Before a grapefruit is processed in the present machine, it is desirable that the skin be subjected to a short scalding treatment, such as by immersing the grapefruit briefly in hot water. At station A, a grapefruit T (FIG. 7) is deposited in a cup 63, either manually or automatically. When the fruit reaches station B (FIG. 8), the position of the grapefruit is adjusted manually by the operator so that the stem axis of the fruit is in a centered, upright position in the cup with the stem end 65 of the grapefruit disposed in uppermost position. At station C (FIG. 9), the stem end of the fruit is split into eight equal segments 66 of 45° each. While held in stationary position at station D (FIG. 10), the short cuts in the peel between the segments 66 at the stem end of the fruit are lengthened by suitable cutters to extend down to a point adjacent the cup 63 and a circular cut 67 is made in the stem end of the fruit to cut the segments 66 of peel loose from the core of the fruit. At station E (FIG. 11), the upper end of each segment of peel is lifted to position the ends so that they can be readily gripped by stripper members at the succeeding station. When the fruit reaches station F (FIG. 12), a stripper grasps each peel segment 66 and pulls it outwardly and downwardly away from the body portion of the fruit to loosen the segments from the body. Before leaving this station, the loosened peel segments are folded back up into original position, as seen in the second illustration of station F (FIG. 13). At station G (FIGS. 14 and 15), the loosened peels are forced downwardly once more, while the body portion of the fruit is pushed upwardly out of the skin by a ram 762 and is ejected from the cup 63, leaving the separated peel in the cup. The peel is removed from the cup at station H (FIG. 16) by a brush (not shown) leaving the cup ready to again receive an unpeeled grapefruit at station A.

General Frame Structure

In FIGURES 1, 2 and 3 the reference numeral 68 indicastes generally a grapefruit peeling machine constructed in accordance with the teaching of the present invention. The machine has a support structure 69 (FIG. 1) including an elongated central frame 70 (FIGS. 1 and 4) which is secured to and extends upwardly from two transverse foot members 71. The frame 70 comprises top and bottom members 72 and two side members 73, all suitably secured together to form a rigid support frame. Angle bars 74 and 75 are secured transversely across the top member 72 at opposite ends of the frame 70. A table top 76 (FIG. 4) is mounted in fixed position above the support structure 70 and has one end secured by a plurality of posts 77, one only being illustrated, to angle straps 78 which are welded to the transverse angle bar 74. At the opposite end of the table top 76, a plurality of flanges 79, one only being illustrated, project downwardly from the table top and are secured to blocks 80 which are rigidly mounted on the transverse angle bar 75. The stationary table top 76 has an aperture 76a (FIG. 4) through which an oscillating control shaft 81 extends. The shaft 81 controls the movements of a secondary actuating mechanism which actuates an auxiliary motion transmitting mechanism at stations D, E, F, and G to supplement the action of the primary mechanism at each station in carrying out the function of the station. The stationary table top 76 has a second aperture 76b through which the tubular turret drive shaft 64 extends. A transverse beam 82 (FIG. 5) is rigidly mounted in spaced relation above the table top 76 on the upper end of a support tube 83. The beam 82 has an adjustable clamping end 82a which is fixedly secured to the support tube 83 by bolts 82b. The support tube 83 extends downwardly through the tubular drive shaft 64, through an opening 72a (FIG. 4) in the top frame member 72 and is secured at its lower end in an aperture 72b in the bottom frame member 72.

Drive Mechanism

The turret drive shaft 64 (FIG. 4) rests at its lower end on a thrust washer 87 which transmits the weight of the turret to the frame 70. A Geneva gear 88 is locked to the shaft 64 by a setscrew 89 and is actuated by a Geneva driver 90 (FIG. 17) which carries the usual driver roller 90a for driving engagement in radial slots 88a of the Geneva gear 88. The Geneva driver 90 is keyed to a drive shaft 91 which is journalled in the frame 70 for rotation about a vertical axis. The drive shaft 91 is keyed by a pin 92 and setscrews 93 to a hub 94 of a barrel cam 95 to which a sprocket 96 is secured by a bolt 97 (FIG. 4). An endless chain 100 is trained around the sprocket 96, an idler sprocket 102, and a drive sprocket 103 which is keyed to a power take-off shaft 105 of a speed reducer 106. An electric motor (not shown) drives the power input shaft 108 of the speed reducer 106 through a belt drive 110. With this arrangement, the power driven sprocket 96 simultaneously drives the barrel cam 95 and the Geneva drive shaft 91.

Rotation of the drive shaft 91 causes oscillation of the control shaft 81 (FIG. 17) through an angle indicated by the reference letter X. This driving engagement of the shafts 91 and 81 is effected by means of two arms 115 and 116 which are keyed to the control shaft 81 and extend outwardly therefrom. At its outer end the arm 115 carries a roller 118 that rides on the peripheral camming surface 119 of a cam disc 120 keyed to the drive shaft 91. The arm 116 carries a roller 123 which rides along the camming surface 124 of a cam disc 125 keyed to the drive shaft 91. The camming surfaces 119 and 124 are so constructed and the angle between the arms 115 and 116 is such that the control shaft 81 will be positively oscillated through the angle X once during each complete revolution of the shaft 91.

As best seen in the plan view (FIG. 3), a circular plate 130 is disposed concentric with the turret 62 and spaced above the turret. This circular plate 130 has a hub 132 (FIG. 5) in which a rod 133 is secured. The rod 133 extends downwardly in sliding, guided relation through bushings 134 and 135 (FIG. 4) which are secured in the support tube 83. At its lower end, the rod 133 carries two spaced rollers 136 and 137 (FIG. 4) which are arranged to engage opposite sides of a cam ring 140 integrally formed on the barrel cam 95. The cam ring 140 (FIG. 17) has an upper dwell portion 144 and a lower dwell portion 145 with slanted transition surfaces 146 and 147 connecting the upper and lower portions. With this arrangement, when the barrel cam 95 is rotated in a counterclockwise direction (FIG. 17), the rod 133 will be raised as the roller 136 rides up the slanted surface 146. While the rollers traverse the upper dwell 144, the rod 133 will be held in the elevated position, and, as the roller 136 rides down the slanted surface 147, the rod 133 will be lowered. Since the above-mentioned circular plate 130 is rigidly secured to the rod 133, the plate 130 will be raised and lowered with the rod.

When the circular plate 130 is held in its elevated position, primary processing apparatus at several stations is held in an elevated position withdrawn from the fruit. When the circular plate 130 is lowered, the several processing mechanisms move into engagement with the fruit. Therefore, the up and down movement of the circular plate constitutes the primary means for actuating the processing apparatus of the machine and will be referred to as the "primary control plate."

The control shaft 81 controls a second mechanism, hereinafter referred to as the secondary motion, which actuates an auxiliary set of processing apparatus employed to supplement the action of the primary processing apparatus. When the roller 136 is on lower dwell of the barrel cam 95, after the circular plate 130 and the primary processing apparatus have been lowered, the control shaft 81 is swung clockwise (FIG. 17) to bring the auxiliary processing apparatus into operation. During the time the roller 136 is on the upper dwell of the barrel cam, after the circular plate 130 and the primary processing apparatus have been moved to elevated position, the control shaft 81 is swung counterclockwise to move the auxiliary processing apparatus to withdrawn position. This coordinated movement of the primary processing apparatus, the auxiliary processing apparatus and the turret, is possible because the Geneva drive shaft 91 controls the raising and lowering of the circular plate 130, the oscillation of the control shaft 81 and the indexing of the turret.

In summary, while the roller 136 is on the upper dwell of the barrel cam, the primary control plate 130 is stationary while the turret is indexed and the control shaft 81 is swung counterclockwise to withdraw the auxiliary processing apparatus. While the primary control plate 130 is lowered to bring the primary processing apparatus into operation, the turret and the control shaft 81 are stationary. While the roller 136 is on the lower dwell of the barrel cam, the primary control plate 130 and the turret are stationary while the control shaft 81 is swung clockwise to bring the auxiliary processing apparatus into operation. While the circular plate 130 is elevated, the turret and the control shaft 81 are stationary.

*Fruit Feed Station*

When each cup 63 comes to rest at station A (FIG. 3), a grapefruit is placed in the cup manually or by means of an automatic feeding mechanism. Each cup 63 comprises a flat base plate 160 which spans the opening between the outer ends of radial arms 162 of the turret 62, each side edge of the plate 160 being secured by bolts 163 to a mounting plate 165 that is rigidly secured on the end of each arm 162. The cup 63 has a generally cylindrical body portion 167 (FIG. 5) integrally formed with the base plate 160 and projecting upwardly therefrom. A lip 170, formed at the upper edge of the body portion 167, is provided with a plurality of equally spaced notches or recesses 172 along its outer surface. The inner surface of the lip 170 is of generally frusto-conical configuration to provide a socket in which the grapefruit is supported and has a plurality of equally spaced grooves 174 formed therein.

*Fruit Aligning Station*

Referring to FIGURES 3 and 19, it will be noted that when a cup 63 comes to rest at station B, the vertical axis of the cup is automatically aligned with the axis of a vertical light tube 185 which extends downwardly from a ventiliated box 186 in which a lamp (not shown) is mounted. The tube 185 has a central opening in its lower end through which a beam of light is projected downwardly to form a spot of light 187 approximately one-quarter of an inch in diameter on the grapefruit in the cup. At station B, the operator manually shifts the grapefruit until the button on the stem end 65 of the grapefruit coincides with the spot of light. The grapefruit is then centered in the cup. The box 186 is supported by the tube 185 and the tube 185 is in turn supported by an arm 190 (FIG. 1) and has, at one end, a collar 191 secured to a bar 192 depending from the transverse beam 82 of the support structure. At its other end, the support arm 190 has a collar 194 (FIG. 19) which encircles the light tube 185 and is secured thereto by a setscrew 195.

*Stem End Splitting Station*

The apparatus at station C for splitting the stem end of the grapefruit into eight equal segments is illustrated in FIGURES 20 through 26. A cutter assembly 210 (FIG. 21), which is part of the primary processing apparatus, is mounted for reciprocating movement in a vertical direction and is arranged to move downwardly into the stem end of the grapefruit as the primary circular control plate 130 is moved downwardly by the barrel cam 95. A clamping ring 212 is supported by the cutter assembly 210 and moves downwardly with the cutter assembly to engage the grapefruit to hold it in position during the cutting operation and while the cutter is withdrawn from the grapefruit peel. A locking mechanism 215 (FIG. 23) is operably connected to the clamping ring 212 to positively prevent upward movement of the ring during the withdrawal of the blades of the cutter from the peel.

The cutter 210 (FIG. 26) comprises a generally tubular blade carrier 220 which has an upper threaded portion 222 and a lower tapered portion 223 with a central bore 224 extending through the upper portion 222 and part way through the lower portion 223. A plurality of radial slots 227 are provided in the lower portion 223 of the carrier. Each slot is arranged to receive and hold a blade 230 which has a cutting portion 231 and a hooked end 232 which extends into the slot and is hooked around a ball 233 disposed in the bore of the carrier. To assemble the cutter 210, the hooked end of a blade 230 is inserted in each slot 227, as seen in FIG. 26, and then the carrier 220 is pushed into a cylindrical hub member 235 which has a central bore 236 tapered to conform to the taper of the carrier 220. A nut 237 is threaded onto the upper portion of the carrier to lock the blades in assembled position. A rod 239 is then secured in the upper end of the carrier by a setscrew 240.

The cutter assembly 210 is reciprocated in a vertical direction by means of a bracket 242 (FIG. 21) comprising two spaced plates 243 and 244 which are connected at their lower end by a crossbar 245 and are secured at their upper ends by bolts 247 to a channel 248. The channel 248 is secured by bolts 250 to the reciprocating primary control plate 130. A pair of rollers 252 (only one being shown) are connected to the free end of the channel 248 straddling the oscillating control shaft 81 and arranged to roll along the shaft 81, using the shaft to guide the vertical movement of the channel. The crossbar 245 has an aperture 254 therein through which the cutter assembly actuating rod 239 extends freely. A nut 255 threaded on the upper end of the rod 239 limits the downward movement of the rod 239 relative to the crossbar 245 and provides a means for lifting the cutter assembly 210 when the bracket 242 moves upwardly with the primary control plate 130. A spring 256 is disposed around the rod 239 between the crossbar 245 and the nut 237 and normally urges the cutter assembly 210 downwardly away from the crossbar 245 to the position seen in FIG. 21.

The clamping ring 212 is supported by the cutter assembly 210 by means of a circular plate 258 (FIG. 21) which is rigidly secured to the lower end of the hub member 235. The plate 258 has two diametrically opposed openings 259 (one only being illustrated). A short tube 260 is pressed into each opening 259 to extend upwardly from thet plate 258 and slidably guide a tube 261 which is rigidly secured in an opening in the clamping ring 212. A collar 262 is adjustably secured to each tube 261 above the upper end of each guide tube 260 and is arranged to contact the top of the tube 260 to limit the downward movement of the clamping ring 212 and to thereby cause the circular plate 258 to support the clamping ring 212. Two guide rods 264 project downwardly from a plate 265 which is secured to the transverse beam 82. Each guide rod is positioned to slidably receive one of the tubes 261 in guiding relation so that the clamping ring 212 will move in a fixed vertical path. A coil spring 267 is disposed around each rod 264 and is compressed between the mounting plate 265 and the upper end of the tube 261 to urge the tube 261 downwardly along the rod.

In FIG. 21 the primary control plate 130 is shown in its uppermost position. Accordingly, the clamping ring 212 and the cutter assembly 210 are in an elevated position spaced above the grapefruit in the cup 63. When the control plate 130 is lowered, the clamping ring and the cutter assembly move downwardly as a unit. The blades of the cutter contact the grapefruit just before the fruit is engaged by the clamping ring. The weight of the cutter and the pressure of the spring 256 cause the cutter blades 230 to penetrate the skin and split the stem end of the grapefruit into eight segments, while the clamping ring is held on the grapefruit by the pressure of the springs 267.

Since at each subsequent station, the apparatus at the station must be aligned with the cuts which define the segments of the skin, it is necessary that no change in the position of the grapefruit be made as the blades 230 are withdrawn from the grapefruit. To assure that the grapefruit remains in fixed position, the clamping ring is prevented from moving upwardly during the withdrawal of the blades by means of the fixture lock 215 (FIG. 23) which comprises a base 280 rigidly secured by bolts 281 (FIG. 21) to a plate 282 which projects downwardly from the mounting plate 265. The base 280 has a cylindrical wall 284 (FIG. 23) which defines a chamber 285 in which a rotor 287 (FIG. 24) is rotatably mounted. The rotor 287 has three spaced segmental cylindrical surfaces 289 slidably journalled on the inner surface of the cylindrical wall 284, and has recesses 292 provided between the surfaces 289. A dog 294, pivotally mounted in a socket 296 formed in each recess 292, is urged in a clockwise direction (FIG. 24) by a spring 297 to move an edge 298 of the dog into engagement with the inner surface of the cylindrical wall 284. The rotor 287 is keyed to a shaft 300 which extends through the base 280 and through the plate 282 into keyed engagement with a first control arm 302. A second control arm 303 (FIG. 23) has a hub portion 304 with a socket 305 formed therein of a configuration to receive in driving engagement a nut 306 formed integrally on a dog-tripping member 308. The member 308 consists of a flat circular plate 310 which lies close against the face of the rotor 287. The nut 306 projects outwardly from one side of the plate 310 and three finger-like trip members 312 project from the other side of the plate into the recesses 292. Each finger 312 is disposed between an abutment surface 313 (FIG. 24) formed on the rotor 287 and the pivotal dog 294 which is disposed in the recess. Counterclockwise pivoting of control arm 302 (FIG. 24) causes counterclockwise movement of the rotor 287 resulting in the movement of each dog 294 away from the adjacent finger 312. As the dog 294 moves away from the finger, the spring 297 swings the dog into engagement with the wall 284 of the base 280, as illustrated in FIG. 24. The combined gripping power of the three dogs with the wall is sufficient to prevent clockwise rotation of the control arm 302 when small pressures are applied to the arm 302.

The control arm 303 has a yoke 314 (FIG. 23) secured thereto. A rod 315, which is secured in upright position on the clamping ring 212, extends through the yoke 314 and has a pair of spaced washers 316 arranged to abut each side edge of the yoke to effect movement of the control arm 303 as the rod 315 is moved. The control arm 302 has a yoke 318 secured to its outer free end. A rod 320, which is secured in fixed position extending upwardly from the cutter plate 258, fits between the arms of the yoke 318 so that a nut 321 on the rod 320 will contact the yoke 318 after a predetermined amount of downward movement of the rod 320.

When the clamping ring 212 and the cutter assembly 210 move downwardly as a unit into contact with the grapefruit, the downward movement of the clamping ring is arrested first, permitting the cutter assembly 210 to penetrate the skin of the grapefruit while the fruit is held by the clamping ring. This final movement of the cutter causes the nut 321 on the rod 320 to pivot the control arm 302 in a counterclockwise direction (FIG. 24) moving the dogs 294 away from the fingers 312 in the recesses 292 and allowing the springs 297 to swing the dogs into gripping engagement with the stationary wall 284 of the base 280. Then, when the cutter assembly 210 starts its upward movement the frictional drag of the blades on the skin will not be strong enough to lift the clamping ring 212 since the dogs 294 are in locked position and prevent the clockwise pivoting of the arm 303 which controls the upward movement of the clamping ring 212. However, when the blades are clear of the grapefruit, the upper edges of the short tubes 260 (FIG. 21) abut the stop collars 262 and exert a strong positive lifting force on the tubes 261 tending to lift the clamping ring 212 clear of the fruit. This force is transmitted from the ring 212 through the rod 315 (FIG. 23) and the control arm 303 to the fingers 312 which contact the abutment surfaces 313 of the rotor and apply a clockwise turning movement to the rotor 287 against the resistance of the gripping engagement of the three dogs 294. The dogs 294 are so designed that their gripping power is sufficient to resist a turning movement caused by the small frictional drag of the blades as they leave the grapefruit skin, but is not sufficient to resist the turning movement due to the positive lifting action of the clamping ring. Accordingly, when the tubes 260 on the cutter engage the stop collars 262, the clamping ring is lifted free of the grapefruit and move to the elevated position shown in FIG. 22.

*Peel Cutting Station*

The apparatus, used at station D to lengthen the short cuts in the skin made by separating the stem end of the grapefruit into segments, is shown in FIGURES 27 through 33. As seen in FIGURE 27, when the cup 63 comes to rest at station D, it is directly below and in axial alignment with a tubular support member 340 which is welded to the outer free end of a flange 341 (FIG. 30) extending radially from the turret axis. The flange 341 is secured to the underside of the reciprocating primary control plate 130, by means of a mounting plate 342 which is welded across the top of the flange 341 and is bolted to the control plate 130. A tube 345 is secured inside the tubular support member 340 by setscrews 346 which also secure a motor support plate 347 to the support member 340. A cutter assembly 349 is mounted on the tube 345 so that when the tube is reciprocated by the primary control plate 130 the cutter assembly will be moved up and down. The assembly comprises a hub 350 secured to the tube 345 by a setscrew 352. The hub 350 is octagonal in shape (FIG. 32) and has eight flat side wall faces 354 on each of which a pivot box 356 is secured by a capscrew 358. Each pivot box 356 has a recess or groove 357 in which a cutter control arm 360 is pivotally mounted. A lever 362, which is pivotally mounted on a pin 363 at the lower end of each arm 360, carries a disc cutter 364 in fixed position at its inner bifurcated end. A spring 368 (FIGS. 30 and 32) is anchored at one end on a cap screw 369 in the control arm and, at the other end, in a hole in the end of the lever 362 so that the spring 368 urges the lever 362 in a clockwise direction until the lever engages an adjustable stop member 370 which is mounted on the control arm 360 in the path of movement of the lever 362. When the eight levers 362 are in the position indicated in FIG. 30, the cutters 364 are in alignment with the cuts in the top of the grapefruit. It is evident that, by loosening the setscrew 352, the entire cutter assembly can be rotated on the fixed tube 345 to align the cutters with the cuts in the stem end of the grapefruit during the initial adjustment of the machine.

When the primary control plate 130 moves downwardly, the cutter assembly moves downwardly into contact with the grapefruit, each cutter 364 moving into one of the short cuts between the stem end segments of the peel. As the cutters contact the skin of the grapefruit, the levers 362 are pivoted in a counterclockwise direction (FIG. 30) against the resistance of the springs 368 so that, as seen in FIG. 27, the disc cutters 364 are elevated above the point of pivotal connection of the levers 362 on the control arms 360. Therefore, during the continued downward movement of the cutter assembly, the disc cutters are drawn downwardly along the grapefruit causing the sharpened leading edge 372 (FIG. 33) to slice into the skin. The depth of the cut in the skin is controlled by a series of springs 374 (FIG. 27) that are secured in a lateral position between adjacent control arms 360 to form a circular elastic band which simultaneously urges all cutter arms radially inwardly to press the cutter discs into the grapefruit until the outer surface of the skin adjacent each cut bears against the underside of the bifurcated end of the lever 362. When the cutter assembly 349 is in elevated position (FIG. 30) the springs 374 urge the control arms 360 radially inwardly until adjustable screws 375 abut the hub 356. The screws 375 thus provide a means for accurately positioning the cutters 364 relative to the center of the grapefruit.

While the eight cuts are being made by the disc cutters, a circular cut is made in the top of the grapefruit by a tubular cutter 376 (FIG. 30) which is mounted on a rotatable shaft 377 journalled inside a tubular shaft 378 which is, in turn, slidably journalled in the fixed tubular support member 340. At its upper end, the rotatable shaft 377 is supported by a collar 380 which is secured to the upper end of the shaft and rests in a circular recess 381 formed in a bearing 382 at the outer end of a support arm 383. The arm 383 has a hub 384 secured to the reciprocating rod 133. Rotation of the cutter shaft 377 is effected by means of a belt 385 that is trained around a pulley 387 keyed to the shaft 377 and a pulley 388 keyed to the drive shaft of a motor 390 that is mounted on the plate 347. It is to be noted that, while the shaft 377 is supported by the bearing 382 in the reciprocating support arm 383, it is free to move upwardly out of the bearing. Accordingly, when the rotating tubular cutter 376 moves downwardly with arm 383, it contacts the stem end of the grapefruit and cuts into the skin until the outer surface of the skin contacts a circular stop plate 392 secured to the tubular cutter. As the support arm 383 continues downwardly, the collar 380 moves upwardly out of the bearing 382 and the belt 385 rides upwardly along the pulley 388. The tubular cutter 376 has openings 393 in its side wall to permit the ejection of peel segments from the inside of the cutter by a conical cam member 394 mounted in the cutter.

In FIG. 31 a modification of the tubular cutter is shown in which the cutter is not rotated. When the cutter contacts the grapefruit, the shaft 377 immediately moves upwardly compressing a spring 395 which is disposed around the shaft 377 between the bearing 382 and a collar 396 secured to the shaft. When the resistance of the spring builds up sufficiently, the cutter will penetrate the skin to a depth determined by the stop plate 392. The circular cut is made deep enough so that the fibrous strands, that radiate outwardly from the stem end of the grapefruit, are severed so that, when the peel segments are pulled outwardly and downwardly, the end of the stem will not resist movement of the peel and the fibers will readily separate from the flesh of the grapefruit and strengthen the peel segments to prevent tearing of the segments as the peel is pulled away from the flesh.

When the eight cuts in the skin of the grapefruit have been extended downwardly to a point adjacent the top of the support cup 63, the cutter control arms 360 (FIG. 30) are swung outwardly to carry the cutter discs out of the cuts and position them radially outwardly of the grapefruit so that the cutters will not contact the grapefruit when the cutter assembly is moved upwardly to its initial position. The outward swinging movement of the cutter control arms 360 is carried out by a frustoconical cam 397 (FIG. 30) that is secured to the lower end of the slidable tubular shaft 378. When the cam 397 is moved downwardly it engages rollers 398 which are rotatably mounted on the inner ends of arms 399 secured to the control arms 360. As the cam moves over the rollers 398, the control arms 360 are swung outwardly to the position illustrated in FIG. 39 in which the cutter discs are radially outwardly of the fruit. If no grapefruit is positioned in the cup 63 when the cutter assembly moves downwardly, the cutter discs are maintained in a radially inner position during the entire downward movement of the cutter assembly. When the cone cam 397 swings the control arms outwardly, the cutter discs pass through the slots 174 in the cup 63 without contacting the cup.

The cone cam 397 is moved to an upper retracted position by a spring 400 (FIG. 30) disposed around the upper end of the tubular shaft 378 between a collar 401 on the support tube 340 and a collar 402 that is integrally formed on a block 403 secured to the shaft 378. The cone cam 397 is moved downwardly into engagement with the rollers 398 by means of a lever 410 that has, at one end, a yoke 412 straddling the block 403 and having slotted end portions engaged over pins 414 (FIG. 36) that extend from opposite sides of the block. At its opposite end, the lever 410 is pivotally mounted on a pin 415 journalled in bearing posts 416 which project upwardly from a plate 417 secured to the primary control plate 130. It will be seen in FIG. 30 that, when the lever 410 is pivoted counterclockwise, the tubular shaft 378 and the cone cam 397 will be moved downwardly. The lever 410 has an angle member 420 secured thereto with one flange 421 of the angle projecting in a generally horizontal direction. A roller 425 (FIGS. 36 and 37), which is part of the secondary actuating linkage, is mounted directly above the horizontal flange 421 on a U-shaped lever 426 that is pivoted on a pin 427 journalled in bearings 428 which project upwardly from a mounting plate 429 secured to the primary control plate 130. On the opposite side of the pivot axis from the roller 425, the U-shaped lever 426 carries a laterally extending bar 430 (FIG. 35) which overlies a roller 431 mounted on a short link 432. The link 432 is rigidly secured to a lever 433 which is keyed to a shaft 435 journalled in an elongated tubular bearing 436 (FIG. 36) secured to the mounting plate 417. The shaft 435 is oscillated by a rod 440 which is pivotally connected at one end, through an adjustable universal joint 441, to a lever 442 which is keyed to the oscillating control shaft 81. At its other end the rod 440 is connected through a universal joint 445 to a lever 446 that has a hub portion 447 (FIG. 36) keyed to the shaft 435. As previously explained, each time the primary control plate 130 is raised and lowered, the control shaft 81 is oscillated through angle X. When the control shaft 81 is moved from the position illustrated in full lines in FIGS. 35 and 36 to the position shown in FIGS. 38 and 39, the shaft 435 and the lever 433 keyed thereto will be swung counterclockwise (FIG. 38) causing the link 432 and the roller 431 to be raised against the laterally extending bar 430 of the U-shaped lever 426. Upward movement of the bar 430 causes counterclockwise pivoting of the U-shaped lever 426 (FIG. 37) moving the roller 425 downwardly into contact with the horizontal flange 421 of the angle member carried by the lever 410. When the roller 425 presses the lever 410 downwardly (FIG. 30) the cone cam 397 is moved into engagement with the arms 399 to swing the disc cutters to the radially outer position.

In summary, at station D, the cutter assembly 349 is reciprocated in a vertical direction as the rigid mounting tube 340 is moved up and down by the primary control plate 130. As the assembly moves downwardly each disc cutter 364 enters a slit previously cut in the grapefruit and lengthens the cut to a point adjacent the upper end of the cup 63. While these cuts are being made by the disc cutters 364, a circular cut is made in the stem end of the grapefruit by a power driven rotating tubular cutter 376. The circular cut separates the end of each segment of the peel from the stem. After the circular cut has been made and the eight elongated cuts have been lengthened to a desired point, the secondary motion control shaft 81 is swung through angle X to actuate a system of levers and linkages to move the cone cam 397 downwardly into contact with the arms 399 to pivot the disc cutters 364 to their radially outer position, just before the cutter assembly 349 is raised to initial postion by the primary control plate 130. During the interval in which the upper dwell of the barrel cam holds the cutter assembly 349 in elevated position, the secondary motion control shaft is returned to its initial position to actuate the rod 440 and the associated linkages to permit the spring 400 (FIG. 30) to lift the cone cam 397 and allow the arms 360 to swing inwardly.

*Peel Lifting Station*

The apparatus at station E, for lifting the upper end of each segment of peel away from the body of the fruit to permit a stripper member at the next station to more easily grasp the peel, is illustrated in FIGURES 40 to 45, inclusive. In general, a lifter assembly 455 (FIG. 40) is secured to the primary control plate 130 and is reciprocated in a vertical direction as the plate 130 is reciprocated. The lifter assembly has articulated, pivotable arms 456 which enter the V-shaped cuts at the upper ends of the skin segments and lifting the ends upwardly while a clamping ring 457 presses downwardly on the fruit at a point spaced below the upper ends of the peel. After the ends of the segments have been raised by the pivoting arms, the entire lifter assembly is raised as a unit to move the arms and the clamping ring upwardly to the initial elevated position.

The lifter assembly 455 comprises a tube 461 (FIG. 40) which is slidably journalled in an upright support tube 462 welded to the outer end of a flange 463. The flange 463 is secured to the primary control plate 130 by means of a plate 464 that is bolted to the plate 130 and welded across the top of the flange 463. A collar 465 rests on the support tube 462 and is secured by a setscrew 466 to the upper end of the slidable tube 461 to cause the tube 461 to move upwardly with the support tube 462. To prevent rotation of the collar 465 a pin 465a extends outwardly from the collar 465 to a position between two upstanding posts 467 which are secured to an angle member 429a carried by the mounting plate 429. Near the lower end of the slidable tube 461, a spider 468 is secured to the tube by a setscrew 470. A mounting plate 472, which is disposed in spaced relation below the spider 468, is supported by the spider 468 and held in rigid position by means of three rods 473 which are secured at their upper ends in the spider and are threaded at their lower ends in the mounting plate 472. A pivot hub 474 is secured to the underside of the plate 472 by a capscrew 475. The spider 468 has three arms 478 (FIG. 45) each of which has a guide opening 479 therein and a short guide tube 481 secured to the upper surface of the arm in alignment with the guide opening. A lifter ring 483 is disposed below the spider 468 and is supported from the spider by three rods 484, each of which is secured in the ring 483, and extends upwardly through the guide opening 479 and the tube 481 and is secured by set screws at its upper end in a control ring 485. Each rod 484 has a collar 486 secured thereon between the control ring 485 and the guide tube 481 and a collar 487 between the spider 468 and the lifter ring 483. Eight articulated lifter arms 456 (one only being shown in FIG. 45) are carried by the lifter ring 483. Each lifter arm 456 comprises a first link 490 pivotally connected at 491 to the underside of the ring 483, a second link 493 pivotally connected at 494 to the first link 490, and a hook 495 secured by a capscrew 496 to the radially inner end of the second link. The hooks 495 have side walls 497 that converge and are joined to form V-shaped pockets which are of a size to fit down over the ends of the segments of the grapefruit skin. The second link 493 of each lifter arm has a tab 500 (FIG. 40) that extends into a slot 501 formed in the pivot hub 474 and is pivotally mounted therein on a pin 503.

The clamping ring 457 is supported directly below the eight articulated lifter arms 456 by three rigid rods 511 which are threaded into the ring 457 and extend upwardly between the lifter arms and the lifter ring 483 into threaded engagement with a support spider 512. The spider 512 is secured by a setscrew 513 to the lower end of a rod 514 that is slidably journalled in the tube 461. Near its upper end the rod 514 is supported by means of a laterally projecting arm 516 which has, at one end, an integrally formed collar 517 that is secured to the rod 514. At its other end, the arm 516 carries a bolt 519 which is threaded through a tapped opening in the arm 516 and extends downwardly to rest on the mounting plate 429 secured to the upper surface of the primary control plate 130. Accordingly, when the control plate 130 is raised and lowered, the rod 514 and the clamping ring 457 carried by the rod are raised and lowered.

When the primary control plate 130 is at its lowermost position, the clamping ring 457 will rest on the grapefruit in the cup 63 therebelow. Since the function of the clamping ring is to maintain the grapefruit in fixed position while the hooks lift the ends of the peel segments, it is necessary that the ring be locked against upward movement away from the grapefruit. Locking of the ring is effected by means of a rack 525 (FIGS. 40 and 41), which is secured to one leg 526 of an angled lever 527 that has a second leg 528 projecting in a direction substantially normal to the leg 526, and a pivot collar 530 welded on the top surface of the second leg 528. The collar 530 is secured by a setscrew to one end of a shaft 532 that is rotatably journalled in a sleeve 533 welded to the upper surface of a platform 535 which is supported by the two upstanding posts 468 which are mounted on the mounting plate 429. A collar 539 is secured to the other end of the shaft 532. It will be noted that the angled lever 527, which carries the rack 525, is mounted for swinging movement on shaft 532 and clockwise pivoting movement of the lever 527 will swing the rack into engagement with a tooth 542 secured to and projecting laterally from the arm 516 (FIG. 41). When the tooth 542 is engaged in one of the teeth of the rack, the rod 514 which carries the clamping ring 456 cannot be moved upwardly. The angled lever 527 is swung clockwise about shaft 532 by the contact of a stationary upstanding rod 545 (FIG. 40) with the second leg 528 of the angled lever. The rod 545 is mounted in a collar 546 welded to a support arm 547 that is secured to a stationary part 550 of the frame of the machine. The rod is so positioned that when the clamping ring 457 and its supporting mechanism is lowered by the circular plate 130, the second leg 528 of the angled lever 527 will contact the rod and engage the rack and tooth just as the plate 130 reaches its lowermost position. Thus, the clamping ring 457 is locked on the grapefruit for the entire period during which the barrel cam 95 holds the mechanism in its lowered position.

During this period when the mechanism is in the lowered position, the hooks 495, which were lowered over the ends of the peel segments, are pivoted by the secondary motion to lift the segments away from the body of the grapefruit. Pivoting of the hooks is accomplished by lifting the lifter control ring 485 (FIG. 40) upwardly by means of a pair of rods 555 (FIG. 42) which are pivotally mounted on pins 556 at spaced points on the upper surface of the control ring 485. The rods 555 extend upwardly on either side of the support tube 462 and each rod passes through an aperture 558 in an arm 560 secured to the U-shaped lever 426 (FIG. 37) which is pivotally mounted on the mounting plate 429. As previously explained in connection with the operations at station D, during the time the various mechanisms are in the lowered position, the control shaft 81 is oscillated through angle X causing roller 431 (FIG. 36) to move upwardly and contact the laterally extending bar 430 of the U-shaped lever 426. As seen in FIG. 37, upward movement of the bar 430 causes pivoting of the lever 426 and upward movement of the arms 560 (FIG. 42) of the lever to engage collars 562 on the rods 555 whereby to lift the rods 555 and the control ring 485 mounted thereon. When the control ring 485 is lifted, the lifter ring 483 is also drawn upwardly causing the articulated levers 456 to pivot at points 491 (FIG. 40) 494, and on the pins 503. As the levers pivot, the hooks 495 swing upwardly and radially outwardly to lift the ends of the peel segments away from the body of the grapefruit as seen in FIG. 43. In this lifting operation the peel segments are bent or creased over the clamping ring 457. At the end of the lifting operation the hooks are pulled free from the peel segments permitting the segments to swing back toward their original position. However, the lifting and creasing of the peel segments is such that the segments do not return entirely to their original position but assume a raised position (FIG. 44) which permits the stripper mechanism at the next station to quickly grasp the segments. When the control ring 485 is raised by the secondary motion, the collars 485 on the lifter rod 484 engage the spider 468 and raise the spider and the mounting plate 472, attached to the spider, against the resistance of two coil springs 570 (FIG. 43) disposed around guide rods 571 extending upwardly from the collar 465. The springs 570 are disposed between the platform 535 and the collar 465 and are arranged to urge the collar downwardly against the tube 462 when the rods 555 are released by the arms 560.

In summary, at station E the clamping ring 457 and the lifter assembly 455 are lowered as the primary control plate 130 is lowered. During the downward movement the clamping ring 457 comes to rest on the grapefruit and the eight V-shaped hooks 495 enter the stem end of the grapefruit around the peel segments that have been previously cut. After the clamping ring and the hooks are in position, the support tube 462 is permitted to continue downwardly until the circular plate reaches its lowermost position. Movement of the support tube 462 and the circular plate 130 relative to the clamping ring and the lifter assembly is possible due to the fact that the collars 465 (FIG. 40), which support the lifter assembly, rest freely on the support tube 462, and the bolt 519, which supports the clamping ring, rests freely on the plate 429.

Just as the control plate 130 reaches its lowermost position, the rod 545 contacts the second leg 528 of the angled lever 527 and pivots the rack 525 in latching engagement with the clamp ring support rod 514. During the lower dwell period, the control lever 81 is pivoted through the angle X, actuating the secondary motion and pivoting the lifter hooks 495 to lift the peel segment ends, crease the segments over the clamping ring 457, and finally lift the hooks free of the grapefruit. When the barrel cam raises the primary control plate 130, the lifter assembly and the clamping ring are elevated to initial position. During the period in which the upper dwell portion of the barrel cam holds the various mechanisms in elevated position, the control shaft 81 is rotated to actuate the secondary motion and permit the U-shaped lever 426 to release the rods 555 permitting the articulated arms 456 to assume their initial, substantially horizontal, position.

*Peel Stripping Station*

The apparatus used at station F to strip the peel segments downwardly away from the body of grapefruit is illustrated particularly in FIGURES 46 to 55 inclusive and comprises a stripper assembly 575 (FIG. 47) which moves downwardly with the primary control plate 130 to engage a grapefruit in the cup 63, the axis of which is aligned with the axis of the stripper head. The stripper assembly 575 comprises a tube 576 slidably mounted in a support tube 577 that is welded to the outer end of a vertical flange 578. The flange 578 is secured to the control plate 130 by means of a plate 579 that is welded to the flange 578 and bolted to the control plate 130. At its lower end, the tube 576 of the stripper head carries a hub 582 secured thereto. As seen in FIG. 46, the hub 582 has an octagonal outer surface with eight flat mounting faces 584 on each of which a block 586 is secured by a capscrew 587. A rigid actuating arm 590, which comprises two composite elongated bars 591 and 592 held in spaced relation by a pin 593, is pivotally mounted on each block 586 by a pin 594. Each arm 590 is urged radially inwardly by a spring 596 which is disposed around a stud 597 which is anchored at one end in a collar 598, welded between the bars 591 and 592, and at the other in a slot 600 in a rigid angle member 601. Each angle member 601 is secured to the block 586 by a capscrew 602 (FIG. 47) and by one of a plurality of capscrews 603 which also secure a ring 605 to the eight blocks 586. Since the spring 596 is compressed between the collar 598 and the rigid angle member 601 it tends to move the pivoting arm 590 inwardly toward the center of the stripper assembly.

A stripper head 610 is pivotally mounted on the lower end of each arm 590 between the bars 591 and 592 which make up the arm. The head 610 includes two triangular plates 615 and 616 which are held in spaced relation by three short tubes 617, 618 and 619 (FIG. 50). The tube 617 is welded between the plates 615 and 616 and journals a pin 622 which extends through the plates and into openings (not shown) in the bars 591 and 592 of the arm 590 to provide a pivot axis for the head 610 relative to the arm 590. The tube 618 is rotatably supported on a pin 624 which is welded between the plates 615 and 616. A rigid, generally U-shaped band 625 has one end 627 welded to the tube 618. The other end of the band 625 has a looped portion 628 on which a stripper finger 630 is slidably mounted by a bolt 631 which extends through a slot 632 in the finger. The finger 630 is welded at one end to the tube 619 which is rotatably mounted on a pin 633 welded between the triangular plates 615 and 616. At its free end the finger 630 carries a V-shaped hook 640 having slanted side walls 641 and 642 (FIG. 46) each of which has a notch 643 cut therein. Each side wall 641 and 642 is triangular in shape so that the lower end of the hook is pointed to facilitate entry of the hook behind the end of the peel segment, as seen in FIG. 50. The looped end portion 628 of the band 625 carries a gripping finger 645 which cooperates with the hook 640 to grip the peel and pull it away from the body portion of the grapefruit as the stripper head 610 pivots on pin 622 during downward movement of the rigid arm 590. The finger 645 has a short bar 646 of oval cross-section at its outer end. In addition to the gripping finger 645, the band 625 has a plurality of aligned prongs 648 which successively engage the peel during the stripping operation. Each prong 648 has a sharpened leading edge 649 adjacent a base 650 which is slanted to facilitate the disengagement of the prongs from the peel when the pivoting movement of the head is reversed during upward movement of the arm 590. In FIG. 52 it will be noted that the cup 63 is provided with a row of holes 652 which receive some of the prongs 648 at the lowermost part of their stripping movement.

Referring to FIG. 47 it will be seen that when the stripper assembly is in its elevated position a spring 660, which is connected between a screw 661 on the arm 590 and the pin 624, rotates the stripper head 610 in a clockwise direction about pin 622 to a position in which the stripper fingers 630 are substantially horizontal and the hooks 640 are pointed downwardly in position to enter the stem end of the grapefruit. As the hooks 640 contact the fruit, a hold-down disc 662 exerts a pressure against the upper surface of the hooks to assist the hooks in penetrating the stem end of the fruit. The disc 662 is secured on the lower end of a rod 665 which is slidably mounted in the tube 576 and extends upwarly through the tube 576 and through a slot 667 (FIG. 53) in a ledge 668 in the upper end of a bracket 669 which is secured by a setscrew 670 to a cylindrical collar 671 rigidly attached to the upper end of the tube 576. The rod 665 has a plurality of removably attached weights 672 (FIG. 48) on its upper end, the lowermost weight normally resting on a rubber pad 673 disposed on the ledge 668. Downward movemnet of the rod 665 is limited by a stop arm 674 (FIG. 38) mounted on an upstanding rod 675 that is secured to the stationary part 550 (FIG. 35).

After the peel segments have been stripped from the body portion of the fruit, the hold-down disc comes to rest on the top of the body portion of the fruit as seen in FIG. 52. Then, when the strippers move upwardly, the disc remains in its lower position for a short time and maintains a pressure on the fruit until the stripper head is well above the equator of the fruit. However, if some reason the stripper head does not disengage itself from the peel on its upward stroke, the grapefruit will be lifted bodily upwardly, thereby also raising the disc to a height greater than it would normally be raised. As a result, the upper end of the rod 665 on which the disc is attached will be raised above its normal elevated position and the uppermost weight 672 will trip a normally closed limit switch 678 (FIG. 6) in the control circuit of the machine causing the machine to be stopped until the grapefruit is removed.

In addition to the eight stripper heads 610 which comprise the primary stripping means, secondary stripping means is provided in the form of a plurality of short curved shoes 680 (FIG. 46). One of these shoes 680 is mounted between each pair of adjacent actuating arms 590 on the lower end of a thin rod 681 which is secured, at its upper end, in one end of a lever 682 pivotally mounted on a pin 683 in a block 684 secured to the underside of the ring 605. A spring 685, disposed between a stop screw 686 in the lever 682 and the ring 605, urges each rod 681 radially inwardly. Each rod 681 has a sharpened lower end 687 which slices into the inner surface of the peel along a previously cut slit during downward movement of the secondary stripper. Each of the eight rods 681 is guided for movement in a vertical direction by a pair of fingers 689 which extend radially outwardly from the periphery of a support plate 690 secured to the rod 665. Rotary movement of the plate 690 is prevented by a pin 692 (FIG. 53) which has a collar 693 secured to the rod 665. The pin 692 extends into a slot 694 in the stationary bracket 669. Since the secondary strippers are carried by the ring 605, they move downwardly simultaneously with the primary stripper heads 610. As seen in FIG. 52, the short curved shoes 680 wedge their way between the peel and the body of the grapefruit, being particularly effective to remove strips of albedo which have a tendency to adhere to the fruit along the lines of the cuts in the peel.

Vertical movement of the tube 576, on which the stripper assembly is mounted, is controlled by a lever 700 (FIG. 35) which is pivotally mounted at one end on a pin 701 journalled in a sleeve 702 supported on a stationary post 703. The lever 700 is connected to the cylindrical collar 671 on the upper end of the tube 576 by means of a lever 704 (FIGS. 48 and 49) which is pivotally connected at its upper end to a pin 705 rotatably journalled in a bearing 707 on the lever 700. At its lower end, the lever 704 is pivotally mounted on a pin 710 that has a large head portion 711 disposed on one side of the lever and a shank portion 712 threaded into the collar 671. In its elevated position the lever 700 rests on a roller 714 (FIG. 35) mounted on a plate 715 which is rigidly secured to the primary control plate 130 by means of a mounting plate 716 and upstanding support posts 717. Accordingly, when the control plate 130 moves downwardly under control of the barrel cam 95, the lever 700 is permitted to move downwardly from the full line position of FIG. 35 to the phantom line position shown in FIG. 38. It is to be noted in FIG. 35 that the lever 700 also rests on a collar 720 which is secured to a rod 721 pivotally mounted on the end of the lever 433 which is pivoted each time the secondary motion is actuated. As previously explained, when the primary control plate 130 is moved downwardly by the barrel cam 95, the roller 714 and the secondary movement linkages also move downwardly. In FIG. 38, the plate 130, the roller 714 and the secondary movement linkages have been moved to their lowermost position by the downward movement of the primary control plate 130. However, this movement of the primary control plate will cause the lever 700 to be moved down only to the phantom line position due to the fact that the rod 721, on which the collar 720 is secured, does not move downwardly with the control plate 130. It will be understood that during this initial downward movement of the lever 700 under control of the control plate 130 the stripper heads contact the peel segments and begin the stripping operation. During the bottom dwell of the barrel cam, the control shaft 81 is swung through the angle X to actuate the secondary motion and pivot the lever 433 counterclockwise to the full line position of FIG. 38. When the lever 433 is swung counterclockwise, a spring 730 connected between the lower end of the rod 721 and the lever 700, rapidly pulls the lever 700 downwardly to the full line position of FIG. 38 to cause a second downward movement of the stripper assembly mounted on the tube 576 to complete the stripping operation.

If for some reason no grapefruit is in the cup 63 at station F when the stripper assembly moves downwardly, it is necessary that the stripper assembly be prevented from taking a full downward stroke because such a stroke would cause the strippers to collide with the cup 63. To prevent such downward movement a solenoid control box 740 (FIG. 47) is mounted on a bracket 741 secured to the support tube 577. The solenoid (not shown) in the control box 740 has a plunger 742 which carries a semi-cylindrical shoe 743. During the operation of the machine, the solenoid is normally energized and the shoe is held in the retracted full line position of FIG. 47. However, if no grapefruit is in the cup 63 as it moves from station E to station F the solenoid will be de-energized through a mechanism that will be described fully hereinafter, and the spring loaded plunger will be moved outwardly to bring the shoe against the tube 576. As seen in FIG. 47, a collar 746 is secured to the tube 576 a short distance above the upper end of the shoe 743. When the solenoid has been de-energized and the shoe has been moved to a position closely adjacent the tube 576, the tube 576 will still be permitted to move downwardly as the primary control plate 130 moves downwardly under control of the barrel cam 95, because the shoe is also movable downwardly with the primary control shaft. However, when the secondary motion is actuated during the bottom dwell of the barrel cam and the lever 433 (FIG. 47) is pivoted, the spring 730 will move the tube 576 downwardly only a short distance before the collar 746 abuts the shoe 743 and stops such downward movement. The spring 730 will, of course, stretch and permit the lever 433 to complete its pivoting movement. With this arrangement the downward movement of the stripper head 610 is arrested before it can contact the empty cup.

In summary, at station F the tube 576 on which the stripper head is mounted is moved through a first range of downward movement as the lever 700 pivots downwardly in response to downward movement of the primary control plate 130. During this first increment of movement, each primary stripper head 610 engages the stem end of the peel segment, clamps the peel between the gripping finger 645 and the hook 640, and begins the stripping operation. During the bottom dwell of the barrel cam, the secondary actuating linkage pivots lever 433 causing spring 730 to pivot the lever 700 and move the tube 576 downwardly through a second range of movement to complete the stripping of the peel from the grapefruit. Each primary stripper head 610 pulls the peel outwardly and downwardly while exerting radially inward pressure on the fruit to prevent any tendency to pull the fruit apart. The secondary stripper shoes 680 move downwardly with the primary stripper heads and wedge in between the peel and the body of the grapefruit to assist in the separation of the peel from the body and to remove strips of albedo which adhere to the grapefruit.

*Fruit and Peel Separating Station*

The mechanism at station G for separating the body portion of the grapefruit from the loosened peel is illustrated in FIGURES 34 and 56 to 59 inclusive. At this station an elastic ring 760 (FIG. 56) is moved downwardly over the grapefruit to slide the loosened peels downwardly and clamp the peel between the cup 63 and the ring assembly 760 while a ram 762 is moved upwardly through the cup 63 to contact the bottom of the fruit and force it upwardly. The upward movement of the fruit further reduces the area of peel adherence and sets the fruit up in position for a laterally swinging wiper member 763 to separate the body of the grapefruit from the clamped skin and force the body portion of the fruit laterally out of the cup.

The elastic ring 760 comprises a rigid metal ring 770 (FIG. 57) having eight pivot boxes 771 secured to its bottom face. Each pivot box 771 (FIG. 34) has a pair of spaced ears 772 projecting inwardly toward the center of the elastic ring, said ears having aligned openings in which a pivot pin 773 is secured. A flat, relatively thin finger 775 has hooked end portions 776 rotatably mounted on the pin 773 and a looped free end portion 778. A peel engaging claw 780, which is secured to the underside of the finger 775 by a bolt 781, is provided with a sharpened edge 782 adapted to grippingly engage the peel as the ring is moved downwardly. A continuous coil spring 790 (FIG. 57) is threaded through the looped inner ends 778 of all the fingers 775 to draw the fingers inwardly.

The elastic ring 760 is moved up and down by means of two support members 791 (FIG. 59) which are secured to the rigid ring 770 and extend upwardly therefrom for connection to depending legs 793 of a bracket 794. The bracket 794 has a cross bar 795, to the upper surface of which is welded a cylindrical post 798 (FIG. 57) having a longitudinal slot 799 therein. A rod 800 (FIG. 56) is secured in the upper end of the post 798 and extends upwardly therefrom through a support tube 894 that is rigidly connected to one end of a vertical flange 806. The flange 806 is secured to the primary control plate 130 by a plate 807 that is welded to the upper surface of the flange 806 and bolted to the plate 130. An actuating lever 810 is pivotally mounted on a pin 811 secured between the before-mentioned stationary part 550 and a mounting arm 813 which is also secured to a stationary part of the frame. The free end of the actuating lever 810, which extends through the slot 799 in the post 798 has a slot 814 therein. A pin 815 is mounted in the post 798 extending across the slot 799 and through the slot 814 in the actuating lever 810. The lever 810 is swung up and down by a threaded rod 816 which is pivotally mounted at one end on a pin 820 adjustably secured in the slot 814 of the actuating lever. At its other end the rod 816 is slidably disposer in a short sleeve 821 (FIG. 57) which has a threaded shank portion 822 rotatably mounted in a plate 823 secured to the mounting flange 806. A compression spring 825 (FIG. 56) is disposed around the rod 816 between the lower end of the sleeve 821 and a nut 826 threaded on the rod 816. The spring 825 normally urges the rod 816 downwardly to hold a collar 827 (FIG. 57), which is secured to the upper end of the rod 816, down on the sleeve 821.

When the primary control plate 130 is moved downwardly by the barrel cam, the rod 816 is moved downwardly causing the arm 810 to swing down and carry the vertically movable elastic ring into contact with the grapefruit. As seen in FIG. 57, as the ring presses against the grapefruit, the spring 790 expands and allows the fingers 775 to swing upwardly. When the claws 780 of the fingers have gripped the peel segments and the resistance of the spring 790 has built up sufficiently, the peel segments will be wiped downwardly causing the lower end portion 835 of each peel segment to fold under the ring and be clamped between the ring and the cup 63. After the peel segments are clamped under the ring, the ram 762 is moved upwardly through the cup 63 to contact the underside of the fruit and move it to the position of FIG. 58.

The ram 762 is actuated by a rod 840 (FIG. 2) that is secured at its upper end in a bracket 841 which is mounted on the vertically reciprocable support tube 462 at station E. The rod 840 is pivotally connected by a universal joint (not shown) to one end of a lever 844 which is pivotally mounted on a pin 845 journalled in a stationary sleeve 846. At its other end, the lever 844 pivotally supports a block 848 in which a push rod 849 is secured. The ram 762 comprises a head 847 mounted on the upper end of the push rod 849. Since the support tube 462 at station E and the elastic ring actuating lever 810 both move downwardly with the primary control plate 130, the ram 762 will begin its upward movement at the same time that the elastic ring 760 begins its downward movement. However, the linkage which controls the movement of the ring 760 and the ram 762 are so chosen that the ring engages the grapefruit and completes the peel removal and clamping action before the ram contacts the bottom of the grapefruit.

After the peeled grapefruit body reaches the position of FIG. 58, the wiper member 763 is swung forwardly from a position behind the cup 63 to eject the grapefruit. The wiper member 763 comprises a U-shaped frame portion 852 (FIG. 59) on which an inverted V-shaped plate 853 is mounted. If desired the leading edge 854 of the plate 853 can be sharpened to act as a cutting edge to facilitate removal of the grapefruit. One end 855 of the wiper frame 852 (FIG. 56) is secured in a vertical rod 858 which is rotatably supported in spaced bearings 859 and 860 of a bracket 861 secured to the support tube 804. A lever 862 has a hub portion 863 at one end secured to the rotatable rod 858. At the other end, the lever 862 carries a universal socket 865 in which a link 866 is threaded. The link 866 is also threaded in a universal socket 867 (FIG. 57) that is carried by a lever 868 which is keyed to the shaft 435 which is swung through a predetermined angular range when the secondary actuating mechanism is operated during the high and low dwells of the barrel cam 95. In FIG. 57 is illustrated the angular position of the shaft 435 during the downward movement of the circular control plate 130. When the downward movement is complete and the position of FIG. 58 is reached the primary actuating mechanism goes into the low dwell period at which time the secondary actuating mechanism swings the shaft 435 clockwise (FIG. 57) through angle X. When the shaft 435 is swung clockwise, the lever 868, the link 866 and the lever 862 are actuated to swing the vertical rod 858 in the direction of arrow 870 and the wiper member 763 is swung forwardly to force the grapefruit from the cup 63.

In FIGURES 60 and 61 a modified embodiment 875 of the elastic ring is shown. This modification comprises an upper ring 876 (FIG. 61) and a lower ring 877 secured together by capscrews 878. Eight straps 880 of vinyl coated fabric are secured in spaced relation between the rings, each strap having an inner looped end portion 881. A metal plate 882 having depending spikes 883 is secured to the underside of each strap by a nut 884 which is threaded on a stud 885 projecting from the top side of the plate 882. A rubber ring 886 is disposed in the looped ends of all the fingers to draw the fingers together. The elastic ring 875 of FIGURES 60 and 61 operates in the same manner as the elastic ring 760 which employs the coil spring 790.

In summary, at station G an elastic ring 760 (FIG. 56) is moved downwardly during the down stroke of the primary control plate 130 to engage the loosened peel segments on the grapefruit and slide them downwardly until the segments become clamped between the ring and the cup 63. At this time the ram 762 is moved upwardly to push the fruit out of the peel and position it so that, when the wiper member 763 is swung forwardly by the secondary actuating mechanism during the bottom dwell of the barrel cam, the grapefruit will be contacted by the wiper and pushed off the cup 63 into a suitable receptacle or onto a conveyor (not shown) which carries the grapefruit to a processing point. After the grapefruit has been ejected, the elastic ring is moved upwardly by the primary control plate 130, leaving the compressed peel on the cup. During the upper dwell period, the wiper member 763 is returned to its position behind the cup 63 by the secondary actuating mechanism.

Peel Discharge Station

When the cup 63 is indexed from station G to station H, it carries the compressed peel under a rotating brush 890 (FIGS. 3 and 62) which has a shaft 891 journalled at one end in the stationary mounting arm 813 and at the other end in a bearing 892 mounted on a bracket 893 which may be connected to the frame of the machine or to the conveyor which carries the grapefruit to the succeeding processing point. It will be seen in FIG. 3 that the brush partially overlies the cup 63 at station H. Further, the lower edge of the brush is at an elevation to wipe across the top surface of the cup and remove any material thereon. The brush is rotated through a sprocket 895 keyed to the brush shaft 891. A chain 896 is trained around the sprocket 895 and around a sprocket (not shown) on the drive mechanism of the discharge conveyor.

In summary, at station H, the peel remaining on the cup 63 is moved underneath the rotating brush 890 which sweeps the peel off the cup and into a suitable receptacle.

Electric Control Circuit

The circuit which controls the operation of the grapefruit peeling machine is schematically shown in FIG. 18. The motor M that rotates the barrel cam 95 and the Geneva drive shaft 91, is energized from a source of three phase, 60 cycle, 220 volt, A.C. current by three leads $L_1$, $L_2$, and $L_3$. Two conductors 901 and 902 are taken from line $L_2$, and one conductor 903 is taken from $L_1$ to supply current to various control switches mounted on the machine.

To put the machine in operation, the operator manually closes a push button switch 905. A circuit will be energized through conductor 902, the switch 905, conductor 907, the normally closed emergency stop switch 678 and the conductor 903. The push button switch 905 is shown in FIG. 1, and the emergency stop switch 678 is shown in FIG. 6. As previously explained, the switch 678 is actuated by the topmost weight 672, if a grapefruit becomes jammed in the stripping assembly at Station F.

With the motor M energized, the operator manually closes a toggle switch 910 (FIG. 18) to energize a circuit through conductor 901, the switch 910, a conductor 912, the lamp 913 of the centering tube 185 at station B, a conductor 914, and conductor 903. When this circuit is energized the lamp 913 is lit at station B to assist in centering the grapefruit. When the motor M and the lamp 913 are energized, the machine can be run through its normal operating cycle and the processing operations at each station will be carried out.

However, the persent control circuit also provides for two emergency conditions, namely, the condition that arises when a grapefruit becomes jammed in the stripper assembly at station F and the condition that arises when an empty cup reaches station F and is positioned in the path of downward movement of the stripper assembly. To provide for these conditions two switches 917 and 918 are mounted on the channel 248 (FIG. 21) at station C. When the primary control plate 130 moves the channel 248 to its elevated position, the switch 917 contacts an arm 920 that projects outwardly from the control shaft 81. Thus, the switch 917 is tripped by the arm 920 just as the primary control plate 130 reaches its upper position but is immediately allowed to return to its initial position when the secondary motion swings the shaft 81 through angle X during the upper dwell period, moving the arm 920 out of engagement with the switch 917. With this arrangement switch 917 is held by an internal spring (not shown) in the full line position of FIG. 18 through the upper dwell period, the downward movement of the control plate 130, the low dwell period, and the upward movement of the plate 130 and is only moved to the dotted line position for a short period at the end of said upward movement and at the beginning of the top dwell period.

Referring to FIG. 18 it will be seen that, if a grapefruit is jammed in the stripper assembly, the emergency stop switch 678 will be moved, by the uppermost weight 672, to the dotted line position opening a portion of the motor circuit. However, since the switch 917 is connected in parallel with the switch 678, the motor circuit will remain energized until the switch 917 is actuated at the top of the upward movement of the primary control plate 130. When the switch 917 is moved to its dotted line position, the motor will be de-energized and the machine will stop to permit the manual removal of the jammed grapefruit.

To provide for the second emergency condition, the second switch 918 on the channel 248 is carried upwardly to a position in the path of movement of a ridge 925 (FIG. 22) formed on the arm 920 when the arm 920 is swung by the control shaft 81 during the upper dwell period. Thus, during each rotation of the barrel cam 95, the normally closed switch 918 is momentarily opened during the upper dwell period. A fruit feeler switch 927 is connected in parallel with the switch 918. This feeler switch 927 is mounted on a laterally projecting portion 930 (FIG. 40) of a support arm 931 that is secured to the stationary arm 547. A feeler arm 933 of the switch 927 extends into the path of movement of a grapefruit in the cup 63 as the cup is indexed from station E to station F. A grapefruit in the cup will contact the feeler arm 933 and pivot it out of its path and momentarily move the switch from the normally open, full line position of FIG. 18 to the closed, dotted line position. The solenoid control box 740 (FIG. 47) is connected in series with the switches 918 and 927. This control box 740 includes a holding switch 940 held in the dotted line closed position as long as the solenoid 939 is energized and is automatically moved to open position when the solenoid is de-energized.

When the grapefruit machine is started at the beginning of a run, the eight cups 63 are empty. When the toggle switch 910 and the push button switch 905 are closed, the machine begins its normal cycle of operation. At the top of each upward movement of the primary control plate, the switch 917 will be moved to the dotted line position to close a circuit through the conductor 903, the switch 917, a conductor 941, the switch 918, a conductor 942, the windings of the solenoid 939, a conductor 943, conductor 912, the toggle switch 910, and the conductor 901 to energize the solenoid 939 and draw the stop shoe 743 (FIG. 47) away from the tube 576 on which the stripper assembly 575 is mounted. The holding switch 940 is moved to the dotted line position when the solenoid 939 is energized. However, during each indexing of the turret, the switch 918 is opened de-energizing the solenoid. When five cups have been filled and the leading grapefruit trips feeler switch 927, the solenoid 941 will remain energized. Thus, by the time the first grapefruit reaches station F, the solenoid switch is energized and the blocking shoe is withdrawn permitting free operation of the stripper assembly.

Each time a grapefruit in a cup 63 moves from station E to station F it trips feeler switch 927 to momentarily close this switch. If no grapefruit is in the cup as the cup moves from station E to station F, the switch 927 will not be closed. Then, when the switch 918 is opened during the upper dwell period, the solenoid circuit will be opened and the spring-urged blocking shoe will be moved outwardly adjacent the tubular shaft 576 to restrict the downward movement of the shaft and prevent the stripper assembly from colliding with the empty cup. On the next upward movement of the primary control plate 130, the switch 917 will be swung to its dotted line position to re-energize the solenoid circuit.

It will be noted that, if the machine is stopped due to a grapefruit becoming jammed in the stripper assembly, the machine will stop, as previously explained, only when the switch 917 is moved to its dotted line position. After the stripper assembly has been cleared, the solenoid circuit will immediately be energized through the switch 917.

Operation

The operation of the machine will be summarized by tracing the movements of a single grapefruit as it is processed at the consecutive stations during one complete rotation of the turret. Reference will be had to FIGS. 3, 7 through 16, 19, 20, 27, 28, 29, 42, 43, 44, 53, 54, 55, 57, 58, 59, and 62, in the order listed.

At station A, FIG. 3, a grapefruit is placed in the empty, generally cylindrical cup 63. The turret is indexed to bring the grapefruit to station B (FIG. 19) at which the cup 63 is moved into axial alignment with the vertical light tube 185 which projects a beam of light downwardly onto the grapefruit. The operator manually shifts the grapefruit to bring the button at the stem end of the grapefruit into registry with the light beam. When the button is aligned with the beam, the stem axis of the grapefruit is in vertical position. The turret is again indexed to bring the cup 63 to station C (FIG. 20) at which the axis of the cylindrical cup 63 is aligned with the axis of a vertically movable cutter 210. The cutter 210 and the clamping ring 212 are moved downwardly, by the primary control plate 130, into engagement with the grapefruit to split the stem end of the peel of the grapefruit into eight segments (FIG. 9). At the end of the downward movement, the fixture lock 215 locks the clamping ring 212 in a position to prevent upward movement of the fruit. The cutter 210 and the clamping ring 212 remain in contact with the grapefruit during the low dwell period. When the primary control plate is moved upwardly, the cutter 210 is withdrawn from the grapefruit and thereafter an upward pressure is exerted on the clamping ring by the cutter 210 causing the ring to over-ride the fixture lock 215, and move to its initial elevated position.

The turret is again indexed to bring the cup 63 to station D (FIGS. 27, 28 and 29) at which the cup 63 is axially aligned with the axis of a vertically movable cutter assembly 349 (FIG. 27). When the primary control plate 130 moves downwardly, the cutter discs 364 enter the slits in the stem end of the peel and extend the slits downwardly to a point adjacent the cup 63 (FIG. 28). During the downward movement, the rotating tubular cutter 376 (FIG. 28) makes a circular cut in the stem end of the fruit to separate the end of each peel segment from the stem of the fruit. During the low dwell period, the secondary motion moves the cone cam 397 downwardly to cam the cutter control arms 360 outwardly and hold them in this outer position so that, when the primary control plate 130 moves the cutter assembly 349 upwardly, the cutter discs 364 will not engage the grapefruit. During the upper dwell period, the secondary motion moves the cone cam 397 upwardly, permitting the cutter arms 360 to swing to their initial inner position.

When the turret is next indexed, the cup 63 is moved to station E and into axial alignment with a peel lifter assembly 455 (FIGS. 42, 43 and 44). When the primary control plate 130 moves downwardly, a clamping ring 457 is moved into locked engagement with the upper portion of the grapfruit and the hooked ends of the pivotable fingers 493 enter the V-shaped cuts at the stem end of the peel. During the low dwell period, the secondary motion draws the lifter ring 483 upwardly causing the fingers 493 to be moved upwardly and to be pivoted to lift the ends of the peel segments and bend them over the edge of the clamping ring 457. The fingers are withdrawn from the fruit at the end of the upward movement of the fingers. When the primary control plate 130 moves upwardly, the clamping ring 457 is unlocked and the entire lifter assembly is raised as a unit. During the upper dwell period, the secondary motion permits the lifter ring 483 to drop downwardly to return the fingers 493 to the initial position shown in FIG. 44.

The turret is next indexed to bring the cup 63 to station F at which the cup is axially aligned with a stripper assembly 575 (FIG. 53). When the primary control plate 130 is moved downwardly, the stripper assembly 575 moves downwardly and each of the eight stripper heads 610 grip the raised end of one of the peel segments and exerts an outward and downward pressure on the peel while exerting radially inward pressure on the fruit. Due to the rolling action of the stripper heads, an extra long peeling stroke is necessary. Accordingly, during the low dwell period, the secondary motion pivots the lever 700 (FIG. 53) and imparts an additional downward movement to the assembly to finish the stripping operation. When the primary control plate 130 is raised, the stripper heads are raised to fold the loosened peels back on the grapefruit. During the upper dwell period the secondary motion returns the lever 700 to its initial elevated position.

When the turret is next indexed, the cup 63 is moved to station G and into axial alignment with an elastic ring 760 (FIG. 57) which is moved downwardly by the primary control plate 130 to slide the loosened peel segments downwardly along the grapefruit body and clamp them between the ring 760 and the top of the cup 63. When the peel is in clamped position, the ram 762 is moved upwardly to pop the peeled grapefruit upwardly out of the peel as seen in FIG. 58. During the low dwell period the secondary motion swings the wiper members 763 into contact with the fruit to completely separate the fruit from the peel and propel it into a suitable container. When the primary control plate 130 is moved upwardly, the elastic ring 760 is lifted away from the cup 63 leaving the peel thereon. During the upper dwell period, the secondary motion swings the wiper member 763 to its initial position behind the cup 63.

At station H the cup is moved underneath the rotating brush 890 (FIG. 62) which sweeps the peel off the cup and into a suitable receptacle. The cup is then ready to be returned to station A to receive another grapefruit to be peeled.

From the foregoing description it will be recognized that the present invention provides a novel, efficient method of peeling fruit such as grapefruit. Referring again to FIGS. 7 to 16, which illustrates the method used to peel a grapefruit, it is evident that the step of making a circular cut 67 in the stem end of the grapefruit, as shown in FIG. 10, to sever the fibrous strands of material at the stem end to free the peel segments from the stem, is an entirely new operation in a fruit peeling process. Similarly, the pre-lifting of the ends of the peel segments, as seen in FIG. 11, to cause them to assume a position partially separated from the grapefruit body, is a novel procedure in a fruit peeling operation. Again, the concept of peeling the segments part way off the fruit (FIG. 12), folding the segments back over the fruit (FIG. 13) and finally sliding the partially separated peels downwardly off the fruit, is new in a method of removing peel. Finally, the step of clamping the partially separated peel and pushing the fruit upwardly out of the peel is clearly a novel way to remove the peel from the fruit. Since each operation in the peeling sequence depends upon the successful completion of a previous operation, it will be recognized that, while the separate operations are new in themselves, they also coact to provide a single, efficient peeling method. Further, the apparatus at the various stations is, in many instances, novel in itself but it is also evident that the various mechanisms cooperate in a novel manner to carry out the peeling method of the present invention.

In the annexed claims the term meridian lines will be used to indicate the path along which the elongated cuts in the peel are made. The portion of the grapefruit at the end of the cuts will be referred to as a polar portion.

It will be understood that modifications and variations may be made without departing from the scope of the present invention.

Having thus described our invention, what we believe is new and desire to protect by Letters Patent is:

1. In a machine for peeling a grapefruit or the like, a support structure, a member on said structure adapted to receive and support a grapefruit, a first cutter mounted above said fruit-support member and arranged for movement downwardly into contact with a grapefruit on said fruit-support member, said first cutter having a plurality of blades arranged to penetrate the peel of the grapefruit and make a plurality of spaced cuts therein, each cut extending along the peel surface from the uppermost end of the grapefruit to a point spaced from said uppermost end, a second cutter mounted for vertical reciprocation on said support structure and having a plurality of blades, means for aligning each blade of said second cutter in vertical alignment with a cut in the grapefruit, and actuating means for moving said second cutter downwardly toward said support member to move each blade on said second cutter into the aligned cut in the peel, and downwardly along the peel to extend the cut during continued downward movement of said second cutter.

2. In a machine for peeling citrus fruit, a support structure, a fruit-supporting member on said structure, a primary control member mounted on said structure above said fruit-supporting member, means mounting said control member for vertical reciprocating movement toward and away from said fruit-supporting member, a processing unit mounted on said primary control member for reciprocation therewith and including a movable processing mechanism mounted for straight line vertical movement in said support structure, a rod mounted for angular movement about its longitudinal axis in said support structure, an auxiliary mechanism connected to the movable processing mechanism of said processing unit, means interconnecting said rod and said auxiliary mechanism to actuate said auxiliary mechanism during angular movement of said rod, first cam means rotatably mounted in said support structure and operable on said primary control member to reciprocate the member, second cam means mounted in said structure and operable on said rod to oscillate the rod angularly about its axis, and a drive shaft connected to said first and second cam means to actuate the cams in timed relation.

3. In a machine for peeling citrus fruit, a support structure, a fruit-supporting member on said structure, a primary control member mounted on said structure above said fruit-supporting member, means mounting said control member for vertical reciprocating movement toward and away from said fruit-supporting member, a processing unit mounted on said primary control member for reciprocating movement therewith and including a control cam mounted for straight line vertical reciprocating movement in said structure, a rod mounted for angular movement about its longitudinal axis in said support structure, an auxiliary mechanism operatively connected to the vertically movable control cam of said processing unit to actuate the same, means interconnecting said rod and said auxiliary mechanism to actuate said auxiliary mechanism during angular movement of said rod, first actuating means operatively connected to said mounting means for reciprocating said primary control member, and second actuating means for oscillating said rod in an angular direction in timed relation with the reciprocation of said primary control means.

4. In a machine for peeling citrus fruit, a support structure, a plurality of cutter arms pivotally mounted on said structure, a cutter-actuating rod slidably mounted in said structure, cam means operatively connected between said rod and said cutter arms for pivoting said arms as said rod is actuated, a lifter ring mounted in said structure, means mounting said ring for reciprocating movement, lifter arms secured to said lifter ring, a shaft slidably mounted in said support structure, a stripper head mounted on said shaft, a control rod mounted for angular movement about its longitudinal axis in said support structure, a lever operatively connected to said control rod to be pivoted as said control rod is angularly oscillated about its axis, means operatively connecting said lever to said slidable cutter-actuating rod, to said lifter ring arms, and to said stripper head shaft, and power means for oscillating said control rod to pivot said lever.

5. In a machine for peeling grapefruit or the like, a stationary support member, a cylindrical fruit-supporting cup mounted on said support member, a carrier member mounted above said cup for movement toward and away from said cup, a rod resiliently mounted on said carrier, a cutter assembly secured to the lower end of said rod, actuating means operatively connected to said cutter to raise and lower the cutter into and out of engagement with a grapefruit supported in said cup, a plate secured to the cutter assembly and extending transversely of the path of movement of said cutter, said plate having a pair of diametrically opposed openings therein, a guide tube mounted on said plate and projecting upwardly therefrom in alignment with each of said openings, a tubular member slidably disposed in each guide tube, a clamping ring carried by said tubular members in spaced relation below said cutter plate, means for urging said tubular members downwardly to move said ring into engagement with the grapefruit, a collar on each of said tubular members movable into engagement with the upper surface of one of said guide tubes to limit the downward movement of said clamping ring and to effect lifting of said clamping ring when said cutter assembly is elevated by said actuating means.

6. In a machine for peeling a grapefruit or the like, a member adapted to support a grapefruit, a cutter mounted above said support member and movable downwardly to engage and penetrate the peel of the grapefruit on said support member, a clamping ring mounted above said support member encircling said cutter and movable downwardly into contact with the grapefruit to clamp the grapefruit on said support member, a locking mechanism having first and second pivotable actuating arms with end portions disposed above said clamping ring and said cutter, a first rod carried by said cutter, an abutment member on said first rod above said first actuating arm and movable into contact with said first actuating arm upon a predetermined amount of downward movement of said cutter to pivot said first actuating arm in a counterclockwise direction, a second rod carried by said clamping ring and pivotally connected to said second actuating arm and arranged to pivot said second actuating arm in a clockwise direction during upward movement of said clamping ring, a fixed stationary member in said locking mechanism, a frictional gripping member in said locking mechanism operatively connected to said first actuating arm, means for moving said gripping member into frictional locking engagement with said stationary member upon pivoting of said first actuating arm in said counterclockwise direction, and means on said second actuating arm movable into contact with said gripping member upon pivoting movement of said second actuating arm in a clockwise direction to move said gripping member out of frictional engagement with said stationary member.

7. In a machine for peeling a grapefruit or the like, a cutter assembly comprising a generally tubular hub having a closed end portion, an exteriorly threaded open end portion, an intermediate exteriorly tapered portion, and a plurality of radial slots extending into the closed end wall of the hub and through the side walls of the hub at the closed end portion, a ball disposed in the bore of said tubular hub adjacent the wall of the closed end portion, a plurality of blades carried by said hub, each blade having a cutting portion exteriorly of said hub adjacent said closed end portion and a hooked portion extending through one of said slots in hooked engagement around a portion of said ball, a retainer disposed over the intermediate portion of said hub to encircle the hooked portions of said blades, said retainer having an internal tapered surface mating with the tapered surface of said intermediate hub portion, and a nut in threaded engagement on said hub and arranged to urge the mating surfaces of said hub and said retainer into seated engagement.

8. In a machine for peeling grapefruit or the like, a fruit-supporting cup adapted to support a grapefruit with the stem end of the grapefruit aligned with an imaginary vertical line through the center of said cup, a hub mounted above said cup for vertical reciprocating movement toward and away from said cup, a plurality of arms pivotally mounted in depending relation on said hub at points spaced from said vertical line for movement in radial planes through the center of said cup, a lever pivotally mounted on the lower end of each arm, a cutter secured to the end of each lever, and cooperating abutment means on each arm and the associated lever for holding said lever projecting inwardly toward said imaginary vertical line, cooperating abutment means on each arm and said hub for limiting the inward position of the arm to a position wherein the inner end of the associated cutter is disposed close to the vertical line through the center of said cup, and means for moving said hub downwardly to move said cutters into contact with the grapefruit adjacent the stem end.

9. In a machine for peeling a grapefruit or the like, a cylindrical fruit- supporting cup, means on said cup for centering a grapefruit with the stem axis of the grapefruit in alignment with the axis of said cylindrical cup and with the stem end uppermost, a tubular cutter mounted for vertical reciprocating movement relative to said cup and in alignment with the axis of said cup, means for moving said tubular cutter into engagement with the grapefruit on said cup to cut a circular section from the stem end of the grapefruit peel, a hub mounted for vertical reciprocation relative to said cup, a plurality of arms pivotally mounted on said hub for movement in radial planes through the axis of said cup, a cutter pivotally mounted on each pivotal arm, means for positioning said arms with said cutters disposed close to the vertical line through the axis of the cup, and means for moving said hub downwardly to move the cutters on said pivotal arms into cutting engagement with the peel of the grapefruit adjacent the circular opening in the peel, the pivotal mounting of each arm being effective to permit the cutter to swing outwardly away from said axis as the cutter moves downwardly along the grapefruit, and the pivotal mounting of each cutter being effective to permit the cutter to automatically adjust its cutting edge in a forward-facing position as it moves through the peel.

10. In a machine for peeling a grapefruit or the like, a support, a fruit-holding cup mounted on said support, a tube disposed directly above said cup, the axis of said tube being aligned with the center of said cup, means mounting said tube for reciprocating movement toward and away from said cup, a hub secured to the lower end of said tube, a plurality of arms pivotally mounted on said hub for movement in a radial plane of said tube, a cutter pivotally mounted on each arm, actuating means for moving said tube downwardly toward said cup to move said cutters into cutting engagement with a grapefruit in said cup, the pivotal mounting of said cutters on the associated arms being effective to permit the cutters to automatically adjust their cutting edges in forward-facing positions as said cutters traverse the grapefruit surface, a rod extending upwardly through said tube in sliding engagement therewith, a cam carried by said rod, a cam follower mounted on each pivotable cutter arm spaced from the pivot axis of the arm and in the path of downward movement of said cam, means for moving said cam downwardly into contact with said cam followers to swing said cutter arms radially outwardly from said hub after said cutters reach the end of the cutting stroke.

11. A machine for peeling grapefruit or the like comprising a support structure, a fruit-supporting member mounted on said structure and having an annular fruit-supporting surface, a control plate mounted above said fruit-supporting member for vertical reciprocating movement in said support structure toward and away from said fruit-supporting member, a hub secured to said control plate with the axis of the hub in alignment with the center of said annular support surface, a plurality of arms pivotally mounted in a circular formation on said hub for movement radially of said hub, a cutter mounted on each arm, resilient means urging said arms radially inwardly, first actuating means operatively connected to said control plate for moving said plate from an elevated position with said cutters spaced above a grapefruit on said support surface to a lowered position in which said cutters are in peel slitting contact with the grapefruit, a control rod mounted for oscillation on said support structure, a cam mounted inside the circle of said pivotal arms, an abutment member on each arm in the path of movement of said cam, means mounting said cam for vertical reciprocation between a position spaced from said abutment members to a position in contact with said abutment members, a linkage interconnecting said oscillating rod and said cam mounting means, and second actuating means for angularly shifting said control rod after said control plate reaches said lowered position to move said cam into contact with said abutment members to pivot said arms radially outwardly away from the grapefruit.

12. In a machine for peeling a grapefruit or the like having the peel separated into segments which are V-shaped at one polar portion of the grapefruit and extend away from the polar portion along the sides of the grapefruit, apparatus for lifting the V-shaped peel segment ends away from the body of the grapefruit comprising means for supporting the grapefruit in stationary position with the V-shaped ends of the peel segments uppermost, a plurality of lifter fingers pivotally mounted directly above the uppermost end of the grapefruit, each finger being of substantially V-shape and disposed in alignment with one of the V-shaped peel segment ends, means mounting said fingers for movement downwardly toward said fruit support means, activating means for moving said mounting means and said fingers downwardly into engagement with the peel segment ends, and means for pivoting said fingers while in engagement with peel segments in a direction away from the body portion of the grapefruit radially outwardly from the center of the stationary grapefruit to lift said end segments.

13. In a machine for peeling a grapefruit or the like having the peel separated into segments which are V-shaped at the stem end of the grapefruit and extend away from the stem end along the side of the grapefruit, apparatus for lifting the ends of said peel segments away from the body of the grapefruit comprising, means for supporting the grapefruit in stationary position with the stem end in predetermined position, a support structure movable directly toward and away from the stem end of the fruit on said fruit-supporting means, a plurality of fingers pivotally mounted in circular formation on said support structure with the center of the formation being aligned with the stem end of the fruit and each finger being disposed for pivotal movement in a radial plane, each finger having a V-shaped inner end aligned with a V-shaped peel segment end and adapted to enclose said segment end, actuating means for moving said support structure toward said fruit-supporting means to move said finger into enclosing position over said peel segment ends, and means for pivoting said fingers to move said V-shaped inner ends radially outwardly and away from the body portion of the stationary grapefruit to apply a radially outward pressure on the associated peel segment end to lift said end away from the body portion of the grapefruit.

14. In a machine for peeling a grapefruit or the like having the peel separated into segments which are V-shaped at the stem end of the fruit and extend away from the stem end along the side of the grapefruit, apparatus for lifting said peel segment ends away from the body portion of the grapefruit comprising means for supporting the grapefruit with the stem end uppermost, a clamping ring mounted directly above said fruit supporting means and movable downwardly to engage the grapefruit thereon, a lifter ring mounted for vertical reciprocation above said clamping ring with the center of said ring in vertical alignment with the stem end of the grapefruit, a hub mounted below and centrally of said lifter ring, a plurality of articulated lifter arms disposed in radial planes of said lifter ring and having outer portions pivoted on said lifter ring and inner portions pivoted on said hub, each arm having a V-shaped inner end portion adapted to enclose one of the V-shaped peel segment ends, and each arm extending radially inwardly substantially to a vertical line through the center of said lifter ring, actuating means for moving said clamping ring downwardly into engagement with the grapefruit encircling the peel segment ends, means for locking said clamping ring in position on the grapefruit, means for moving said lifter ring downwardly to position the inner end portions of said arms over the peel segment ends, means for elevating said lifter ring to raise the outer ends of said lifter arms while said hub is held in fixed position whereby to pivot the arms about their pivotal connection to said fixed hub and lift the peel segments upwardly and outwardly away from the body portion of the grapefruit.

15. In a machine for peeling grapefruit or the like having the peel separated into a plurality of segments which are V-shaped at a polar portion of the grapefruit and extend away from said polar portion along the side of the grapefruit, a support structure, a fruit-supporting member mounted on said structure and having an annular support surface adapted to hold a grapefruit with the polar portion disposed substantially on a vertical line through the center of said annular support surface, a control plate disposed above said support surface, means mounting said control plate for vertical reciprocating movement toward and away from said support surface, a lifter ring operatively connected to said control plate for vertical reciprocation therewith, a hub mounted below and centrally of said lifter ring, a plurality of lifter arms pivotally mounted on said hub for movement in radial planes of said lifter ring and having outer portions pivotally mounted on said lifter ring and inner portions pivotally mounted on said hub, each arm having a hooked inner end adapted to enclose the end of a peel segment, first actuating means operatively connected to said control plate mounting means for moving said control plate between an elevated position in which the inner hooked end of each of said lifter arms is spaced directly above a peel segment end and a lowered position in which each hooked end is positioned around the peel segment end, a control rod mounted for oscillation in said support structure, a linkage interconnecting said control rod and said lifter ring whereby angular movement of said rod in one direction effects elevation of said lifter ring and pivoting of said lifter arms, and second actuating means for angularly shifting said control rod in said one direction after said control plate reaches said lowered position whereby to pivot said lifter arms and move the hooked ends radially outwardly and upwardly.

16. In a machine for peeling grapefruit or the like a support structure, a fruit-supporting member mounted in fixed position on said structure, a member mounted for vertical reciprocation in said support structure, a rod operatively connected to said member for vertical reciprocating movement therewith, a clamping ring mounted on said rod directly above said fruit-supporting member and arranged to be moved into clamping contact with a grapefruit held in said fruit-supporting member, means for moving said ring downwardly, a tooth carried by said rod, a rack pivotally mounted on said reciprocating member for movement between a position spaced from said tooth and a position in engagement with said tooth, and stationary abutment means mounted on said support structure in the path of movement of said rack and arranged to be contacted thereby immediately after said clamping ring contacts the grapefruit in the fruit-supporting member to pivot said rack into engagement with said tooth whereby to prevent upward movement of said clamping member relative to said reciprocating member.

17. In a machine for peeling a citrus fruit having the peel slit along meridian lines extending from a polar portion of the fruit outwardly along the sides of the fruit, a stripper mechanism comprising a fruit supporting member arranged to hold the fruit with the polar portion in fixed position, a plurality of stripper heads disposed in circular formation adjacent said support member, a peel gripping member on each head, means mounting each head for rotary movement in a radial plane of the circle defined by said heads, means for moving each head toward said support member to engage the gripping member of the head with the end of the peel segment at the polar portion of the fruit, means for rotating said head in a direction to move said gripping member away from the fruit in a radial direction, and means urging a portion of said head radially inwardly against the fruit during rotation of said head.

18. In a machine for peeling a grapefruit or the like having the peel separated into segments and the ends of the segments raised away from the body of the grapefruit, a stripper mechanism comprising a fruit supporting member having a horizontal annular support surface adapted to support a grapefruit thereon with the raised ends of the peel segments centered about a vertical line through the center of said annular support surface, rotary stripper members mounted above said support surface for rotation in radial planes passing through the center of said support surface, a peel engaging member on the inner end of each stripper member, means for positioning each peel engaging member directly above one of said peel segment ends, means mounting said stripper heads for vertical reciprocating movement, actuating means operatively connected to said mounting means to move said stripper heads downwardly to engage said peel-engaging members with said segment ends, means for urging each stripper head inwardly against the grapefruit as the head is moved downwardly whereby to effect rotation of the head and radially outward movement of the peel-engaging member of the head.

19. In a machine for peeling a citrus fruit having the peel slit along meridian lines extending from a polar portion of the fruit outwardly along the sides of the fruit, a stripper mechanism comprising a fruit supporting member arranged to hold the fruit with the polar portion in fixed position, a plurality of stripper heads disposed in circular formation adjacent said support member, a peel gripping member on each head, means mounting each head for rotary movement in a radial plane of the circle defined by said heads, means for moving each head toward said support member to engage the gripping member of the head with the end of the peel segment at the polar portion of the fruit, means for rotating said head in a direction to move said gripping member away from the fruit in a radial direction, means urging said head radially inwardly against the fruit during rotation of said head, a wedge member mounted above said support member and radially inwardly of each stripper head said wedge member having a wedging surface and a cutting edge, and means for moving said wedge downwardly during rotation of said head to move the wedging surface into contact with the fruit at the juncture of the peel and the body portion of the fruit to maintain a wedging pressure at this juncture during rotation of the head, and to move the cutting edge into contact with the inner surface of the peel.

20. In a machine for peeling grapefruit or the like having the peel separated into segments and the ends of the segments raised to a position spaced from the body portion of the grapefruit, a stripper mechanism comprising a fruit-supporting member having an annular support surface arranged to support a grapefruit with the opening defined by the raised segment ends centered on a vertical line through the center of said annular support surface, a symmetrical hub disposed above said fruit supporting member with the axis of the hub in vertical alignment with the center of said support surface, a plurality of mounting arms pivotally mounted in circular formation on said hub, a stripper head mounted on the lower end of each of said arms for rotation in a vertical plane through the axis of said hub, each stripper head comprising a pair of spaced plates rotatably mounted on one of said arms, means connecting said plates in fixed spaced relation, a slotted finger pivotally mounted between said plates at a point spaced from the axis of rotation of the plates, said finger having a hooked end, a rigid U-shaped member pivotally mounted at one end between said plates at a point spaced from said axis of rotation, a connector secured to the free end of said U-shaped member and slidably retained in the slot of said finger, a clamping member secured to the free end of said U-shaped member in confronting relation to the hooked end of said finger, a spring connected between said plates and said arm normally urging said head to a rotated position with the finger in a substantially horizontal position and the hooked end disposed in vertical alignment with one of said raised peel segments and with the clamping member of said U-shaped member remote from said hooked end of said finger, means mounting said hub for vertical reciprocating movement, actuating means operatively connected to said mounting means for moving said hub downwardly to carry each stripper head into engagement with a raised peel segment, and to move each rotatable stripper head downwardly in rolling engagement along the side of the grapefruit, the free end of said U-shaped member being arranged to slide outwardly along said finger during rotation of said head to slide said clamping member toward said hooked end whereby to clamp the peel segment therebetween, and means operatively connected to said mounting means for moving said head downwardly after the peel segment has been engaged by said clamping member.

21. In a machine for peeling a grapefruit or the like having a peel separated into segments and the ends of the segments lifted to a position raised from the body portion of the grapefruit, a stripper mechanism comprising a fruit support member having an annular support surface arranged to support a grapefruit with the opening defined by the raised segment ends centered on a vertical line through the center of said support surface, a plurality of stripper heads mounted in circular formation above said fruit supporting member with the center of the circle in vertical alignment with the center of said annular support surface, each stripper head being mounted for rotary movement in a vertical radial plane of the circle and having a finger with a radially inner hooked end, means mounting said stripper heads in position directly above a grapefruit on said fruit-supporting member with the inner hooked ends of the fingers in alignment with the raised peel segments, means mounting said stripper head for vertical reciprocating movement toward and away from said fruit-supporting means, actuating means operatively connected to said mounting means for moving said stripper heads downwardly to position the hooked end of each head around one of said raised segment ends, and means for moving each head downwardly in rolling engagement with the grapefruit to rotate each stripper head in a direction to swing said hooked end radially outwardly as the stripper head is moved downwardly whereby to pull the peel segment away from the body portion of the grapefruit.

22. In a machine for peeling a grapefruit or the like having loosened peel segments lying flat against the body portion of the grapefruit, a stripper mechanism comprising a fruit-supporting member having a circular support surface adapted to support a grapefruit with the loosened peel segments extending from the uppermost end of the grapefruit downwardly along the sides thereof, a rigid ring mounted in spaced coaxial relation above said support surface for vertical reciprocating movement toward and away from said support surface, a plurality of rigid fingers pivotally mounted on said ring and extending radially inwardly therefrom, a loop on the inner end of each rigid finger, a continuous coil spring threaded through the loops of all of said fingers to form an elastic band, a claw mounted on the lower surface of each finger, said rigid ring having a diameter greater than the width of the grapefruit, said elastic band having a diameter substantially less than the width of the grapefruit, means mounting said rigid ring for vertical reciprocating movement, and actuating means operatively connected to said mounting means for moving said elastic ring downwardly into contact with the grapefruit to resiliently encircle the grapefruit and wipe the loosened peel downwardly.

23. In a machine for peeling a citrus fruit having the peel slit along meridian lines extending outwardly from a polar portion of the grapefruit and having the ends of the peel segments at the polar portion raised away from the body of the fruit, a stripper mechanism comprising a fruit support member having an annular support surface adapted to support a fruit with the polar portion centered on an imaginary vertical line through the center of said annular support surface, a control plate mounted for reciprocating movement in a vertical direction relative to said fruit support member, a symmetrical hub secured to said control plate and having a control aperture centered about said vertical line, a plurality of arms mounted on said hub for pivotal swinging movement radially inwardly toward said vertical line, a spring connected between each arm and said hub urging said arm radially inwardly, a stripper head mounted on each arm for rotation in a radial plane passing through said vertical line, peel gripping means carried by each head, means connected between each arm and said hub to limit the inward pivoting movement of the arm and to position the peel gripping means on the head directly above a peel segment and at the polar portion of the fruit on said support member, a rod slidably mounted in the center aperture of said hub, a hold down disc secured to the lower end of said rod and positioned directly above the peel gripping means of said head and resting freely thereon, means mounting said hub for vertical reciprocating movement, actuating means operatively connected to said mounting means for moving said hub downwardly toward said support member to move the peel gripping members of said stripper heads into engagement with the segment ends and to move said heads downwardly in rolling engagement with the surface of the grapefruit whereby to move the peel gripping members radially away from the body portion of the grapefruit.

24. In a machine for peeling a grapefruit or the like having loosened peel segments lying flat against the body portion of the grapefruit, a fruit supporting member having an annular support surface adapted to support a grapefruit with the loosened segments extending from the uppermost portion of the fruit downwardly along the sides of the fruit, a rigid ring disposed above said fruit supporting ring in coaxial relation therewith, a plurality of radially extending straps having inner looped ends, a rubber band threaded through the looped ends of said straps to provide an elastic band of a diameter less than the width of the grapefruit, prongs mounted on the lower surface of each strap near the radially inner end of the strap, means mounting said rigid ring for vertical reciprocating movement relative to said support member, and actuating means operatively connected to said mounting means for moving said elastic band downwardly to encircle the grapefruit on said support member and to move said prongs into gripping engagement with the peel, whereby to wipe the segments from the body portion of the grapefruit.

25. In a machine for peeling a grapefruit or the like having loosened peel segments lying flat against the body portion of the grapefruit, a stripper mechanism comprising a fruit-supporting member having an annular support surface adapted to support a grapefruit with the loosened peel segments extending from the uppermost end of the grapefruit downwardly along the sides thereof, a rigid ring having a diameter greater than the width of the grapefruit and mounted in coaxial relation above said support member, an elastic ring mounted coaxially in said rigid ring, said elastic ring having a diameter substantially smaller than the width of the grapefruit, means mounting said rigid ring for vertical reciprocating movement, and actuating means operatively connected to said mounting means for moving said elastic ring downwardly into contact with the grapefruit to encircle the grapefruit and wipe the loosened peel segments downwardly.

26. In a machine for peeling a grapefruit or the like having loosened peel segments lying flat against the body portion of the grapefruit, a fruit supporting member adapted to support a grapefruit with the loosened peel segments extending from the uppermost portion of the fruit downwardly along the sides of the fruit, a rigid ring mounted above said support member and having a diameter greater than the width of the grapefruit, an elastic ring mounted on said rigid ring and having a diameter substantially less than the width of the grapefruit, means for moving said rigid ring downwardly to encircle the grapefruit and to draw said elastic ring downwardly over the grapefruit in yielding contact with the loosened peel segments to wipe the segments from the grapefruit body and clamp them between said rigid ring and said support member, and a wiper member mounted for lateral movement across the top of said support member to contact the peeled grapefruit thereon and force it laterally off said support member.

27. In a machine for peeling grapefruit or the like, a stationary support member, a cylindrical fruit-supporting cup mounted on said support member, a carrier member mounted above said cup for movement toward and away from said cup, a rod resiliently mounted on said carrier, a cutter assembly secured to the lower end of said rod, actuating means operatively connected to said cutter to raise and lower the cutter into and out of engagement with a grapefruit supported in said cup, a plate secured to the cutter assembly and extending transversely of the path of movement of said cutter, said plate having a plurality of openings therein, a contact member mounted on said plate adjacent each opening and projecting upwardly therefrom, a plurality of support members projecting upwardly through said openings, a clamping ring carried by said support members in spaced relation below said cutter plate, means for urging said support members downwardly to move said ring into engagement with the grapefruit, an abutment member on each of said support members movable into engagement with the upper surface of one of said contact members to limit the downward movement of said clamping ring and to effect lifting of said clamping ring when said cutter assembly is elevated by said actuating means.

28. In a machine for peeling a grapefruit or the like, a member adapted to support a grapefruit, a cutter mounted above said support member and movable downwardly to engage and penetrate the peel of the grapefruit on said support member, a clamping ring mounted above said support member encircling said cutter and movable downwardly into contact with the grapefruit to clamp the grapefruit on said support member, a locking mechanism having first and second pivotable actuating arms with end portions disposed above said clamping ring and said cutter, means carried by said cutter and movable into contact with said first actuating arm upon a predetermined amount of downward movement of said cutter to pivot said first actuating arm in a counterclockwise direction, means carried by said clamping ring and operatively connected to said second actuating arm and arranged to pivot said second actuating arm in a clockwise direction during upward movement of said clamping ring, a fixed stationary member in said locking mechanism, a frictional gripping member in said locking mechanism operatively connected to said first actuating arm, means for moving said gripping member into frictional locking engagement with said stationary member upon pivoting of said first actuating arm in said counterclockwise direction, and means on said second actuating arm movable into contact with said gripping member upon pivoting movement of said second actuating arm in a clockwise direction to move said gripping member out of frictional engagement with said stationary member.

29. In a machine for peeling a grapefruit or the like, a cutter assembly comprising a generally tubular hub having a closed end portion, an open end portion, an intermediate exteriorly tapered portion, and a plurality of radial slots extending into the closed end wall of the hub and through the side walls of the hub at the closed end portion, a ball disposed in the bore of said tubular hub adjacent the wall of the closed end portion, a plurality of blades carried by said hub, each blade having a cutting portion exteriorly of said hub adjacent said closed end portion and a hooked portion extending through one of said slots in hooked engagement around a portion of said ball, and a retainer disposed over the intermediate portion of said hub to encircle the hooked portions of said blades and lock said blades in said hub.

30. In a machine for peeling a citrus fruit having the peel slit along meridian lines extending from a polar portion of the fruit outwardly along the sides of the fruit, a stripper mechanism comprising a fruit supporting member arranged to hold the fruit with the polar portion in fixed position, a plurality of stripper heads disposed in circular formation adjacent said support member, a peel gripping member on each head, means mounting each head for rotary movement in a radial plane of the circle defined by said heads, means for moving each head toward said support member to engage the gripping member of the head with the end of the peel segment at the polar portion of the fruit, means for rotating said head in a direction to move said gripping member away from the fruit in a radial direction, means urging said head radially inwardly against the fruit during rotation of said head, a pressure applying member mounted above said support member and radially inwardly of each stripper head, said pressure member having a wedging surface, and means for moving said pressure member downwardly during rotation of said head to move the wedging surface into contact with the fruit at the juncture of the peel and the body portion of the fruit to maintain a wedging pressure at this juncture during rotation of the head.

31. In a machine for peeling a grapefruit or the like, a fixed support structure, a generally cylindrical support member having an annular end surface adapted to support a grapefruit thereon, a clamping ring mounted above said support member concentric therewith and movable downwardly into engagement with the grapefruit on said support surface, a cutter assembly mounted for vertical reciprocation above said cylindrical support member and movable downwardly through said clamping ring along a path in alignment with the axis of said support member and into contact with the grapefruit to penetrate the peel, an actuating mechanism operatively connected to said cutter assembly for moving said cutter into and out of engagement with the grapefruit, means for moving said clamping ring into engagement with the grapefruit, an abutment member carried by said ring in the path of upward movement of said cutter, locking means operatively connected between said fixed support structure and said ring for locking said ring in clamping engagement on the grapefruit, and means carried by said cutter and movable into contact with said abutment member after a predetermined amount of upward movement of said cutter away from said grapefruit, and means carried by said clamping ring and operatively connected to said locking means for moving said locking means out of locking engagement incident to contact of said abutment member by said cutter, continued upward movement of said cutter being effective to lift said clamping ring away from said grapefruit.

32. In a machine for peeling citrus fruit having the peel slit along meridian lines to form segments, a fixed support member, a stripper mechanism comprising a fruit holder mounted in fixed position relative to said support member and arranged to support a fruit to be peeled, a plurality of stripper heads adjacent said support member, a peel gripping member on each head for gripping the ends of each peel sigment, a hold down member mounted on said structure above said fruit holder for movement downwardly into engagement with a fruit to clamp the fruit in said fruit holder, a locking mechanism operatively connected between said hold down member and said fixed support member and including a rack mounted on one member and a tooth-like abutment mounted on the other member, means mounting said tooth and rack for relative movement to engage said tooth and rack in locking engagement, and actuating means connected to said hold down member and movable downwardly therewith and operatively connected to said locking mechanism to effect said relative movement incident to downward movement of said hold down member.

References Cited in the file of this patent

UNITED STATES PATENTS

| Number | Name | Date |
|---|---|---|
| 107,794 | McFeely | Sept. 27, 1870 |
| 703,331 | Acree | June 24, 1902 |
| 951,241 | Hampel | Mar. 8, 1910 |
| 1,312,332 | Kirino | Aug. 5, 1919 |
| 1,372,293 | Jones | Mar. 22, 1921 |
| 1,448,532 | Harding | Mar. 13, 1923 |
| 1,766,824 | Jones | June 24, 1930 |
| 1,781,838 | Giesecke | Nov. 18, 1930 |
| 2,076,496 | Dietz | Apr. 6, 1937 |
| 2,139,704 | Thompson et al. | Dec. 13, 1938 |
| 2,277,003 | Polk | Mar. 17, 1942 |
| 2,300,312 | Polk | Oct. 27, 1942 |
| 2,342,131 | Erickson | Feb. 22, 1944 |
| 2,397,007 | Hosmer | Mar. 19, 1946 |
| 2,656,921 | Gray et al. | Oct. 27, 1953 |
| 2,664,129 | Coons | Dec. 29, 1953 |
| 2,740,441 | Coons | Apr. 3, 1956 |
| 2,888,969 | Hardesty et al. | June 2, 1959 |